US012783548B2

(12) United States Patent
Takada et al.

(10) Patent No.: US 12,783,548 B2
(45) Date of Patent: Nov. 3, 2026

(54) INFORMATION PROCESSING DEVICE, INFORMATION PROCESSING SYSTEM, INFORMATION PROCESSING METHOD, AND COMPUTER PROGRAM PRODUCT

(71) Applicant: KABUSHIKI KAISHA TOSHIBA, Tokyo (JP)

(72) Inventors: Masaaki Takada, Kashiwa (JP); Ryusei Shingaki, Setagaya (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 19/053,173

(22) Filed: Feb. 13, 2025

(65) Prior Publication Data

US 2025/0384059 A1 Dec. 18, 2025

(30) Foreign Application Priority Data

Jun. 18, 2024 (JP) ................................ 2024-098009

(51) Int. Cl.
*G06F 16/28* (2019.01)

(52) U.S. Cl.
CPC ................................... *G06F 16/28* (2019.01)

(58) Field of Classification Search
CPC ...................................................... G06F 16/28
See application file for complete search history.

(56) References Cited

U.S. PATENT DOCUMENTS

2011/0276828 A1 11/2011 Tamaki et al.
2017/0178426 A1 6/2017 Ezawa
(Continued)

FOREIGN PATENT DOCUMENTS

CN 118018429 A * 5/2024 .......... H04L 41/142
JP 2009-054843 A 3/2009
(Continued)

OTHER PUBLICATIONS

Peters, et al., "Elements of causal inference: Foundations and Learning Algorithms" The MIT Press, 2017, 289 pages.
(Continued)

*Primary Examiner* — Ann J Lo
*Assistant Examiner* — Fernando M Mari Valcarcel
(74) *Attorney, Agent, or Firm* — Oblon, McClelland, Maier & Neustadt, L.L.P.

(57) ABSTRACT

According to an embodiment, an information processing device includes one or more hardware processors configured to: generate a plurality of exogenous noise estimation values corresponding to a plurality of variables for each of one or more pieces of record data, based on a pre-update model being a structural causal model representing a causal relationship of the plurality of variables; determine whether a causal relationship of the plurality of variables represented by the one or more pieces of record data is different from the causal relationship represented by the pre-update model, based on independence between any two or more variables in the plurality of exogenous noise estimation values with respect to each of the one or more pieces of record data; and generate a post-update model being the structural causal model based on the one or more pieces of record data when determining that the causal relationships are different.

22 Claims, 12 Drawing Sheets

(56) References Cited

U.S. PATENT DOCUMENTS

| | | | | |
|---|---|---|---|---|
| 2018/0307219 | A1* | 10/2018 | Horiwaki | G06N 5/022 |
| 2021/0110287 | A1* | 4/2021 | Perov | G06N 7/01 |
| 2021/0256406 | A1* | 8/2021 | Lau | G06N 7/01 |
| 2022/0398260 | A1* | 12/2022 | Sun | G06N 5/025 |
| 2024/0111488 | A1* | 4/2024 | Sanchez | G06F 7/24 |
| 2024/0295874 | A1 | 9/2024 | Shigemori | |

FOREIGN PATENT DOCUMENTS

| | | | | | |
|---|---|---|---|---|---|
| JP | 5108116 | B2 | | 12/2012 | |
| JP | 5825599 | B2 | | 12/2015 | |
| JP | 6937345 | B2 | | 9/2021 | |
| JP | 7173395 | B1 | | 11/2022 | |
| JP | 7251687 | B2 | | 3/2023 | |
| JP | 2023-173391 | A | | 12/2023 | |
| WO | WO 2022/259446 | A1 | | 12/2022 | |
| WO | WO-2024117019 | A1 | * | 6/2024 | G06F 16/9024 |
| WO | WO-2024180746 | A1 | * | 9/2024 | G06F 16/90 |

OTHER PUBLICATIONS

Shimizu, et al., "A Linear Non-Gaussian Acyclic Model for Causal Discovery", Journal of Machine Learning Research, 2006, 28 pages.
Shimizu, et al., "DirectLiNGAM: A Direct Method for Learning a Linear Non-Gaussian Structural Equation Model", Journal of Machine Learning Research, 2011, 24 pages.
Hyvarinen, et al., "Pairwise Likelihood Ratios for Estimation of Non-Gaussian Structural Equation Models", The Journal of Machine Learning Research, 2013, 42 pages.
Hoyer, et al., "Nonlinear causal discovery with additive noise models", Advances in neural information processing systems, 2008, 8 pages.
Peters, et al., "Causal Discovery with Continuous Additive Noise Models", Journal of Machine Learning Research, 2014, 45 pages.
Peters, et al., "Identifiability of Gaussian structural equation models with equal error variances", Biometrika, 2014, 10 pages.
Vukovic, et al., "Causal Discovery in Manufacturing: A Structured Literature Review", Journal of Manufacturing and Materials Processing, 2022, 17 pages.
Marazopoulou, et al., "Causal Discovery for Manufacturing Domains", arXiv:1605.04056v2 [cs.LG], 2016, 9 pages.
Szekely, et al., "Measuring and Testing Dependence by Correlation of Distances", Annals of Statistics, 2007, 26 pages.
Gretton, et al., "A Kernel Two-Sample Test", Journal of Machine Learning Research, 2005, 51 pages.
Reshef, et al., "Detecting Novel Associations in Large Data Sets", Science, 2011, 16 pages.
Paz, et al., "The Randomized Dependence Coefficient", Advances in neural information processing systems, 2013, 9 pages.
Takada, et al., "Transfer Learning via I1 Regularization" Advances in Neural Information Processing Systems, 2020, 12 pages.
Zou, et al., "The Adaptive Lasso and Its Oracle Properties", Journal of the American statistical association, 2006, 12 pages.
Takada, et al., "Adaptive Lasso, Transfer Lasso, and Beyond: An Asymptotic Perspective", arXiv:2308.15838v2 [stat.ML], 2024, 79 pages.
Wang, et al., "Direct estimation of differences in causal graphs", Advances in neural information processing, 2018, 12 pages.
Ghoshal, et al., "Direct learning with guarantees of the difference DAG between structural equation models", arXiv: 1906.12024v2 [stat.ME], 2021, 20 pages.
Chen, et al., "iSCAN: Identifying Causal Mechanism Shifts among Nonlinear Additive Noise Models", Advances in Neural Information Processing Systems, 2023, 36 pages.
Budhathoki, et al., "Causal structure-based root cause analysis of outliers", In International Conference on Machine Learning, 2022, 13 pages.
Strobl, et al., "Sample-Specific Root Causal Inference with Latent Variables", In Proceedings of the 13th ACM International Conference on Bioinformatics, Computational Biology and Health Informatics, 2022, 10 pages.
Strobl, et al., "Sample-specific root causal inference with latent variables", In Conference on Causal Learning and Reasoning, 2023, 21 pages.

* cited by examiner $$\begin{cases} X_1=E_1 \\ X_2=X_1+E_2 \\ X_3=E_3 \\ X_4=X_3+E_4 \\ X_5=X_2+X_3+X_4+E_5 \end{cases} \Leftrightarrow \underbrace{\begin{bmatrix} X_1 \\ X_2 \\ X_3 \\ X_4 \\ X_5 \end{bmatrix}}_{X} = \underbrace{\begin{bmatrix} 0 & 0 & 0 & 0 & 0 \\ 1 & 0 & 0 & 0 & 0 \\ 0 & 0 & 0 & 0 & 0 \\ 0 & 0 & 1 & 0 & 0 \\ 0 & 1 & 1 & 1 & 0 \end{bmatrix}}_{B^T} \underbrace{\begin{bmatrix} X_1 \\ X_2 \\ X_3 \\ X_4 \\ X_5 \end{bmatrix}}_{X} + \underbrace{\begin{bmatrix} E_1 \\ E_2 \\ E_3 \\ E_4 \\ E_5 \end{bmatrix}}_{E}$$

FIG.4

| | $X_1$ | $X_2$ | $X_3$ | $X_4$ | $X_5$ |
|---|---|---|---|---|---|
| $X_1$ | 0 | 0.92 | 0 | 0 | 0 |
| $X_2$ | 0 | 0 | 0 | 0 | 0.89 |
| $X_3$ | 0 | 0 | 0 | 0.89 | 0.95 |
| $X_4$ | 0 | 0 | 0 | 0 | 0.93 |
| $X_5$ | 0 | 0 | 0 | 0 | 0 |

FIG.9

| | |
|---|---|
| CHANGE IN CAUSAL INFLUENCE: | YES/NO |
| CHANGE IN CAUSAL STRUCTURE: | YES/NO |
| CHANGE IN CAUSAL ORDER: | YES/NO |

FIG.10

| | $X_1$ | $X_2$ | $X_3$ | $X_4$ | $X_5$ |
|---|---|---|---|---|---|
| $X_1$ | 0 | 0.92 | 0.03 | 0 | 0 |
| $X_2$ | 0 | 0 | 0 | 0 | 0.89 |
| $X_3$ | 0 | 0 | 0 | 0.89 | 0.95 |
| $X_4$ | 0 | 0 | 0 | 0 | 0.93 |
| $X_5$ | 0 | 0 | 0 | 0 | 0 |

| | $X_1$ | $X_2$ | $X_3$ | $X_4$ | $X_5$ |
|---|---|---|---|---|---|
| $X_1$ | 0 | 0.03 | 0.03 | 0 | 0 |
| $X_2$ | 0 | 0 | 0 | 0 | 0.01 |
| $X_3$ | 0 | 0.19 | 0 | -0.15 | 0.13 |
| $X_4$ | 0 | 0 | 0 | 0 | 0.01 |
| $X_5$ | 0 | 0 | 0 | 0 | 0 |

INFORMATION PROCESSING DEVICE, INFORMATION PROCESSING SYSTEM, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2024-098009, filed on Jun. 18, 2024; the entire contents of which are incorporated herein by reference.

FIELD

Embodiments described herein relate generally to an information processing device, an information processing system, an information processing method, and a computer program product.

BACKGROUND

A technique of unraveling a complicated structure latent in data using statistics and machine learning is suggested. For example, a technique of analyzing a causal relationship from data using causal discovery and causal inference and improving a prediction method, a decision-making method, and the like is suggested.

For example, in a manufacturing system, causal discovery and causal inference are used to identify factors that influence a product quality and predict influence of process change on the product quality based on raw material data, process data, quality inspection data, maintenance data, and the like. In addition, in an information system, causal relationships between system components are identified so that failure is analyzed and performance improvement is performed.

Meanwhile, a causal structure of data in the manufacturing system and the information system is not constant and may change over time. When causal relationship of data is analyzed using causal discovery and causal inference, it is desirable to update a model used for analysis or the like based on change in a causal structure.

BRIEF DESCRIPTION OF THE DRAWINGS

FIG. 4 is a diagram illustrating an example of an adjacency matrix;

FIG. 9 is a diagram illustrating an example of information output from the model update device;

FIG. 10 is a diagram illustrating an example of an adjacency matrix of a post-update model;

DETAILED DESCRIPTION

According to an embodiment, an information processing device includes one or more hardware processors. The one or more hardware processors are configured to: generate a plurality of external noise estimation values corresponding to a plurality of variables for each of one or more pieces of record data including a plurality of record values respectively corresponding to the plurality of variables, based on the one or more pieces of record data and a pre-update model that is a structural causal model representing a causal relationship of the plurality of variables, the plurality of external noise estimation values each representing estimation values of influence by external noises that are different from influences from the plurality of variables with respect to corresponding variables among the plurality of variables; determine whether a causal relationship of the plurality of variables that is represented by the one or more pieces of record data is different from the causal relationship of the plurality of variables that is represented by the pre-update model, based on independence between any two or more variables in the plurality of external noise estimation values with respect to each of the one or more pieces of record data; and generate a post-update model that is the structural causal model based on the one or more pieces of record data when determining that the causal relationships are different.

Figure 1:
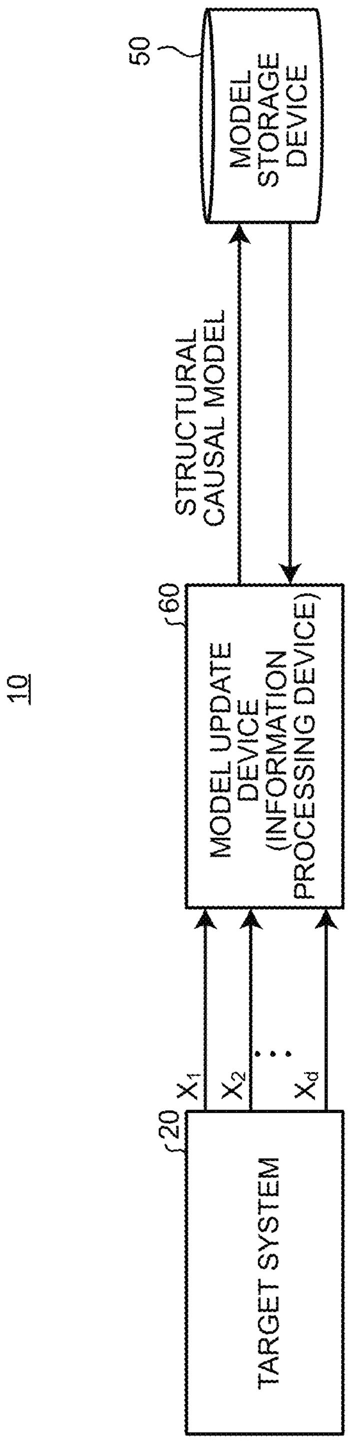
FIG. 1 is a configuration diagram of an information processing system according to an embodiment.

FIG. 1 is a diagram illustrating a configuration of an information processing system 10 according to an embodiment. The information processing system 10 according to the embodiment includes a target system 20, a model storage device 50, and a model update device 60.

The target system 20 is, for example, a manufacturing system that manufactures a product. The target system 20 may be a data processing system that executes a computer process or may be an information processing system that provides an information processing service using information processing. The target system 20 is not limited to such systems and may be any system that handles data.

The model update device 60 is an information processing device that executes information processing. The model update device 60 acquires one or more pieces of record data each including a plurality of record values corresponding to a plurality of variables from the target system 20. The model update device 60 updates a structural causal model (SCM) stored in the model storage device 50.

Each of the plurality of variables represents a value sampled in the target system 20. For example, when the target system 20 is a manufacturing system, each of the plurality of variables represents raw material data such as an amount of raw material and a quality of the raw material, process data such as sensor data obtained by detecting an operating time of a device at time of manufacturing and an environment of the manufacturing device by a sensor, quality inspection data representing a quality and the like of a manufactured product, maintenance data detected during maintenance, and the like.

Each of the one or more pieces of record data is a vector including a plurality of record values. In the present embodiment, each of the one or more pieces of record data is a d-dimensional (d is an integer of 2 or more) vector including d record values corresponding to d variables ($X_1$, $X_2$, . . . , and $X_d$) on a one-to-one basis.

Each of the one or more pieces of record data includes a plurality of record values sampled from the target system 20 under conditions such as different times. For example, first record data and second record data among the one or more pieces of record data are, for example, values sampled from the target system 20 at different times. However, the plurality of record values included in one piece of record data are values sampled under same conditions such as the same time.

In the present embodiment, the model update device 60 acquires record data of n samples (n is an integer of 1 or more). Each of the one or more pieces of record data in the present embodiment is assigned with an index for identifying conditions such as sampled time.

The model storage device 50 stores a structural causal model for the target system 20. The model storage device 50 stores, in advance, a structural causal model obtained by learning record values of a plurality of variables sampled from the target system 20 when executing, for example, operation start, initialization, or factory shipment of the target system 20.

The structural causal model is information representing a causal relationship of a plurality of variables. That is, the structural causal model is information for each set of two variables in the plurality of variables, the information representing whether one variable influences the other variable in the set of two variables and the influence.

In the present embodiment, the structural causal model is a linear model in which a magnitude of influence is represented by a real number and is represented using an adjacency matrix B. The adjacency matrix B represents the magnitude of influence from one variable to the other variable for each combination of two variables in the plurality of variables. In the present embodiment, the number of variables is d, and the adjacency matrix B is represented by a square matrix of d rows and d columns.

Each element in the adjacency matrix B includes a real number value representing the magnitude of influence from a variable identified by a row (one variable) to a variable identified by a column (the other variable). The magnitude of influence from one variable to the other variable may be positive, may be negative, or may be 0. 0 represents that no influence is given from one variable to the other variable. Note that the adjacency matrix B includes the magnitude of influence of a set of variables in which one variable and the other variable are the same. The magnitude of influence of a set in which one variable and the other variable are the same variable is included in diagonal components of the adjacency matrix B and is 0. Note that rows and columns of the adjacency matrix B may be opposite to those in the example of the present embodiment.

After operation of the target system 20, the model update device 60 determines whether the causal relationship of the plurality of variables sampled from the target system 20 is different from the causal relationship of the plurality of variables represented by the structural causal model stored in the model storage device 50 (pre-update model) based on one or more pieces of record data. For example, the model update device 60 determines whether the causal relationship of the plurality of variables sampled from the target system 20 is changed due to deterioration of the target system 20, a change in a situation, or the like. The model update device 60 generates a new structural causal model obtained by learning one or more pieces of record data (post-update model) when it is determined that the causal relationship of the plurality of variables sampled from the target system 20 is different from the causal relationship of the plurality of variables represented by the pre-update model. Then, the model update device 60 updates the structural causal model stored in the model storage device 50 to the generated post-update model.

As a result, the model update device 60 can generate the structural causal model in which the causal relationship of the plurality of variables sampled from the current target system 20 is appropriately reflected even when the causal relationship of the plurality of variables in the target system 20 changes due to a lapse of time, a change in operating situation, or the like.

It is considered that the current causal relationship of the plurality of variables sampled from the target system 20 is changed from the original causal relationship when it is determined that the causal relationship of the plurality of variables sampled from the target system 20 is different from the causal relationship of the plurality of variables represented by the structural causal model stored in the model storage device 50 (pre-update model). Therefore, when it is determined that the causal relationship of the plurality of variables sampled from the target system 20 is different from the causal relationship of the plurality of variables represented by the pre-update model, the model update device 60 further determines a content of the change in the causal relationship and outputs the determination content. As a result, the model update device 60 can support analysis, improvement, and the like of the target system 20.

Figures 2, 3:
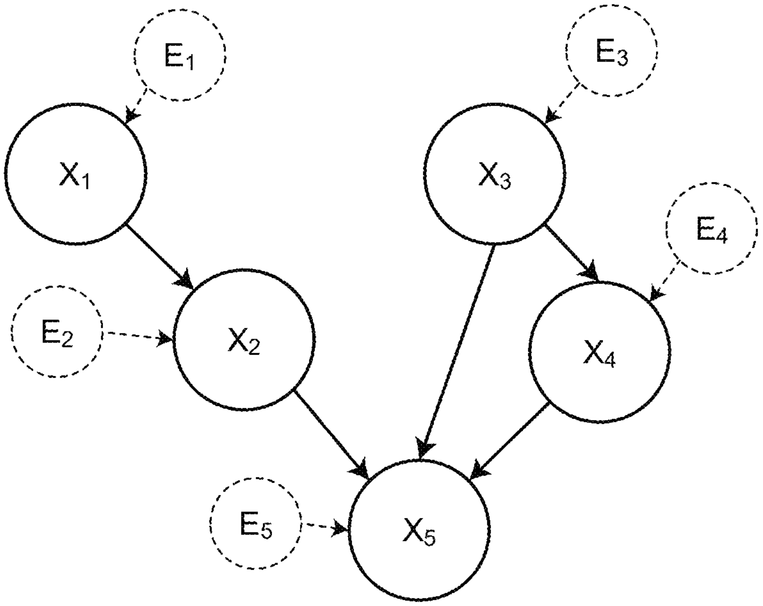
FIG. 2 is a diagram illustrating a structural causal model.
FIG. 3 is a diagram illustrating a causal graph.

FIG. 2 is a diagram illustrating a structural causal model.

In the present embodiment, the structural causal model is expressed as Formula (1).

$$X_k = \sum_{j \in Pa(k)} X_j B_{jk} + E_k, \ (k = 1, \ldots, d) \tag{1}$$

k and j are indices for identifying any variable among the d variables ($X_1$, $X_2$, . . . , $X_d$). $X_k$ represents a value of a variable having an index of k ($X_k$) among the d variables ($X_1$, $X_2$, . . . , $X_d$). $B_{jk}$ is a value of a real number. $B_{jk}$ represents a magnitude of influence from the variable having the index of j ($X_j$) to the variable having the index of k ($X_k$) in a combination of the variable having the index of j ($X_j$) and the variable having the index of k ($X_k$) among the d variables ($X_1$, $X_2$, . . . , $X_d$). $P_a$ (k) represents a set of indices of parent variables that directly influence the variable having the index of k ($X_k$).

$E_k$ represents a magnitude of external noise given to the variable having the index of k ($X_k$). The external noise is noise generated by an external factor different from influences from the plurality of variables.

When represented with a matrix, the structural causal model is represented as Formula (2).

$$X = B^T X + E \tag{2}$$

E is a vector including d external noises ($E_1, E_2, \ldots, E_d$) as in Formula (3). Note that T on the right shoulder represents a transposed matrix.

$$E=(E_1, \ldots, E_d)^T \in \mathbb{R}^d \quad (3)$$

X is a vector including d variables ($X_1, X_2, \ldots, X_d$).

$B^T$ is a transposed matrix of the adjacency matrix B. In the adjacency matrix B, values of d×d elements are real numbers as shown in Formula (4).

$$B \in \mathbb{R}^{d \times d} \quad (4)$$

Note that there are cases in which $B^T$ is referred to as an adjacency matrix, but in the present embodiment, B is set as an adjacency matrix.

The structural causal model can also be represented by a plurality of equations as shown on the left side of FIG. 2. The structural causal model is also referred to as a structural equation model (SEM).

FIG. 3 is a diagram representing a causal graph representing a structural causal model.

A structural causal model is represented by a causal graph that is a directed graph. The causal graph includes d nodes corresponding to d variables ($X_1, \ldots, X_d$) on a one-to-one basis.

$B_{jk}$, that is an element of the adjacency matrix B, represents a value corresponding to a directed edge from a node corresponding to the variable having the index of j ($X_j$) to a node corresponding to the variable having the index of k ($X_k$) in the causal graph.

Note that, when $B_{jk}$ is nonzero, the causal graph includes a directed edge from the node corresponding to the variable having the index of j ($X_j$) to the node corresponding to the variable having the index of k ($X_k$). That is, when $B_{jk}$ is zero, the causal graph does not include the directed edge from the node corresponding to the variable having the index of j ($X_j$) to the node corresponding to the variable having the index of k ($X_k$).

$E_k$ represents exogenous noise influencing the node corresponding to the variable having the index of k ($X_k$).

FIG. 4 is a diagram illustrating an example of an adjacency matrix B.

When d=5, the adjacency matrix B is shown as in FIG. 4. Each element in the adjacency matrix B represents a magnitude of influence from one variable identified by a row to the other variable identified by a column.

The adjacency matrix B is estimated, for example, using a causal discovery algorithm based on one or more pieces of record data. For example, the adjacency matrix B may be estimated using an algorithm such as multiple regression or Adaptive Lasso after a causal order is defined using domain knowledge.

For example, the adjacency matrix B may be estimated using a known causal structure and covariance structure analysis based on one or more pieces of record data. For example, the adjacency matrix B may be estimated using information on whether cause and effect exists between variables and a causal discovery algorithm based on one or more pieces of record data. For example, the adjacency matrix B may be estimated using a causal discovery algorithm under assumption of non-Gaussianity, nonlinearity, equality of variances, or the like. Note that non-Gaussianity is disclosed in Shimizu, S., Hoyer, P. O., Hyvarinen, A., Kerminen, A., & Jordan, M., "A linear non-Gaussian acyclic model for causal discovery", published in 2006, Journal of Machine Learning Research, 7 (10), Shimizu, S., Inazumi, T., Sogawa, Y., Hyvarinen, A., Kawahara, Y., Washio, T., & Hoyer, P. O., "DirectLiNGAM: A direct method for learning a linear non-Gaussian structural equation model", published in 2011, Journal of Machine Learning Research-JMLR, 12 (Apr), pages 1225 to 1248, and Hyvarinen, A., & Smith, S. M., "Pairwise likelihood ratios for estimation of non-Gaussian structural equation models", published in 2013, The Journal of Machine Learning Research, 14 (1), pages 111 to 152. Nonlinearity is disclosed in Hoyer, P., Janzing, D., Mooij, J. M., Peters, J., & Scholkopf, B., "Nonlinear causal discovery with additive noise models", published in 2008, Advances in neural information processing systems, 21, and Peters, J., Mooij, J. M., Janzing, D., & Scholkopf, B., "Causal Discovery with Continuous Additive Noise Models", published in 2014, Journal of Machine Learning Research, 15, pages 2009 to 2053. Equality of variances is disclosed in Peters, J., & Buhlmann, P., "Identifiability of Gaussian structural equation models with equal error variances", published in 2014, Biometrika, 101 (1), pages 219 to 228.

Figure 5:
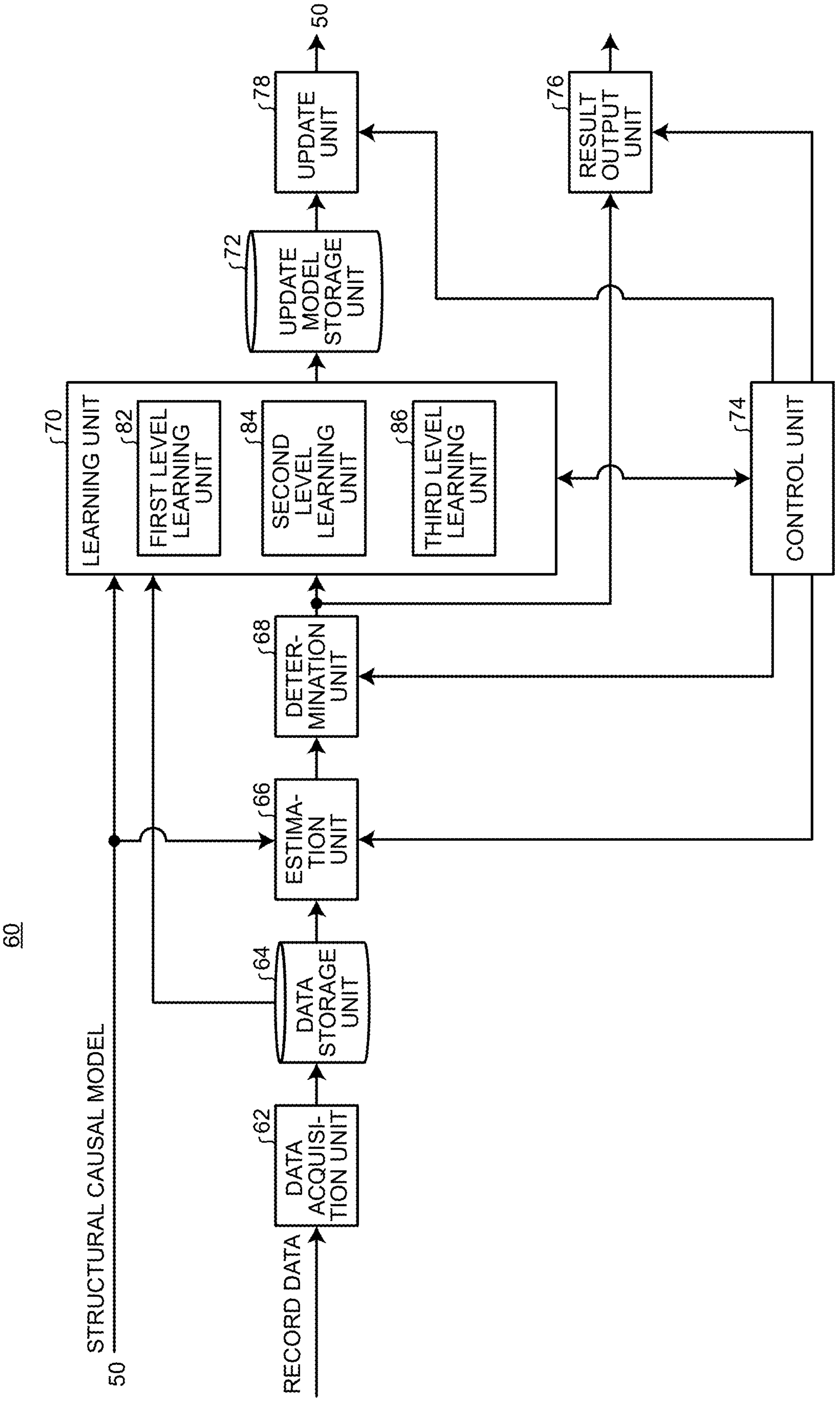
FIG. 5 is a configuration diagram of a model update device.
Figure 6:
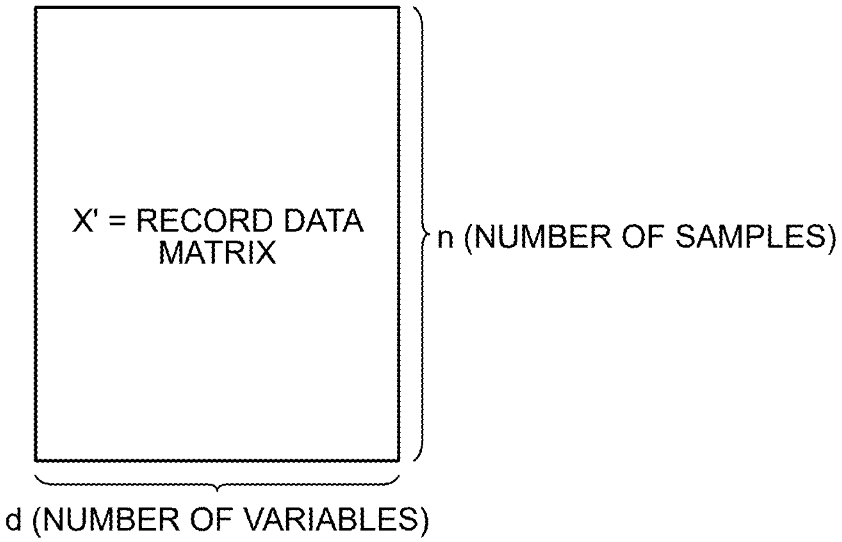
FIG. 6 is a diagram illustrating a record data matrix.
Figure 7:
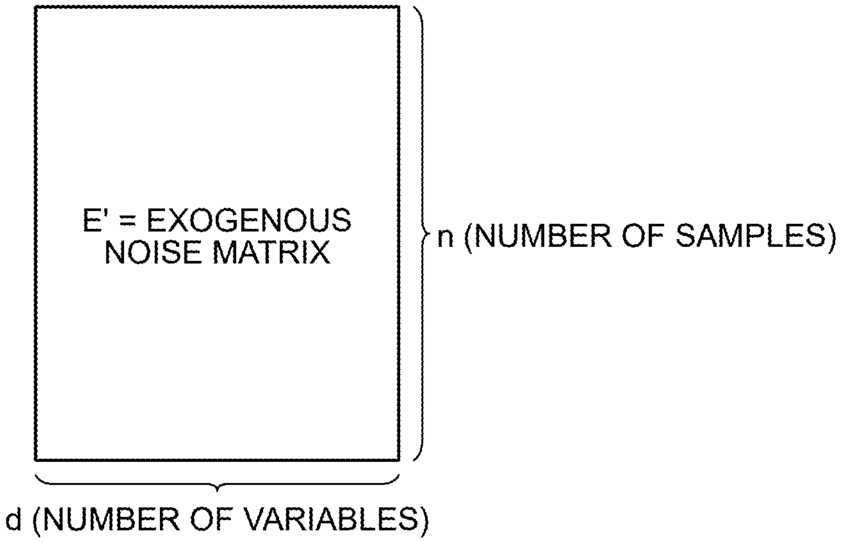
FIG. 7 is a diagram illustrating an external noise matrix.

FIG. 5 is a diagram illustrating a configuration of the model update device 60. Note that FIG. 5 is described with reference to FIGS. 6 to 7. FIG. 6 is a diagram illustrating a record data matrix X'. FIG. 7 is a diagram illustrating an exogenous noise matrix E'.

The model update device 60 includes a data acquisition unit 62, a data storage unit 64, an estimation unit 66, a determination unit 68, a learning unit 70, an update model storage unit 72, a control unit 74, a result output unit 76, and an update unit 78.

The data acquisition unit 62 acquires one or more pieces of record data from the target system 20. In the present embodiment, the data acquisition unit 62 acquires record data including d record values corresponding to d variables for n samples.

The data storage unit 64 stores the acquired one or more pieces of record data. In the present embodiment, the data storage unit 64 stores the record data matrix X' including n rows corresponding to n samples and d columns corresponding to d variables as illustrated in FIG. 6. The element in an i-th row and a j-th column in the record data matrix X' includes $X_{ij}$ that is a record value corresponding to a variable having an index of j among the d variables in a sample having the index of i among the n samples. Note that, in the record data matrix X', i is an integer of 1 or more and n or less. j is an integer of 1 or more and d or less.

The estimation unit 66 calculates a plurality of exogenous noise estimation values corresponding to a plurality of variables for each of one or more pieces of record data based on the one or more pieces of record data and a pre-update model stored in the data storage unit 64. The pre-update model is a structural causal model stored in the model storage device 50.

The plurality of exogenous noise estimation values for each of the one or more pieces of record data correspond to the plurality of variables on a one-to-one basis. Each of the plurality of exogenous noise estimation values represents an estimation value of an influence of exogenous noise on a corresponding variable among the plurality of variables.

In the present embodiment, the estimation unit 66 generates an exogenous noise matrix E'. The exogenous noise matrix E' includes a plurality of exogenous noise estimation values for each of the one or more pieces of record data.

For example, the exogenous noise matrix E' includes n rows corresponding to n samples and d columns corresponding to d variables as illustrated in FIG. 7. An element included in an i-th row and a j-th column in the exogenous noise matrix E' include $e_{ij}$, that is an exogenous noise estimation value obtained by estimating an exogenous noise included given to a variable having the index of j among the d variables in a sample having the index of i among the n samples. $e_{ij}$ is represented by a real number.

The estimation unit 66 calculates the exogenous noise matrix E' by Formula (5).

$$E' = X'(I - B) \tag{5}$$

Note that I represents an identity matrix. That is, the estimation unit 66 calculates the exogenous noise matrix E' by multiplying the record data matrix X' by a matrix (I-B) obtained by subtracting the adjacency matrix B from an identity matrix I.

The determination unit 68 determines whether the causal relationship of the plurality of variables represented by the one or more pieces of record data is different from the causal relationship of the plurality of variables represented by the pre-update model based on independence between any two or more variables in the plurality of exogenous noise estimation values for each of the one or more pieces of record data. In the present embodiment, based on the exogenous noise matrix E' generated by the estimation unit 66, the determination unit 68 determines whether the causal relationship of the plurality of variables represented by the one or more pieces of record data is different from the causal relationship of the plurality of variables represented by the pre-update model.

Here, a case where the structural causal model satisfies assumption of the linear non-Gaussian acyclic model (LiNGAM) is considered. That is, a case where the structural causal model is linear, the exogenous noise is independent and follows non-Gaussian distribution, and the causal graph obtained from the adjacency matrix B satisfies acyclic is considered. Here, when the adjacency matrix B of the pre-update model is sufficiently close to an actual adjacency matrix B representing the causal relationship of the record data matrix X', each column of the exogenous noise matrix E' also independently follows non-Gaussian distribution. Meanwhile, when the adjacency matrix B of the pre-update model is different from the actual adjacency matrix B representing correlation of the record data matrix X', each column of the exogenous noise matrix E' is not independent. That is, when a generation model of the record data matrix X' acquired from the target system 20 at the present time is different from the pre-update model stored in the model storage device 50, the independence of each column of the exogenous noise matrix E' decreases. Using such property, the determination unit 68 determines whether the causal relationship of the plurality of variables sampled in the target system 20 is different from the causal relationship of the plurality of variables represented by the pre-update model.

For example, for each combination of two variables in the plurality of variables, the determination unit 68 selects two columns corresponding to the two variables in the exogenous noise matrix E'. Then, for each combination of two variables in the plurality of variables, the determination unit 68 calculates a measure of independence that is an index representing the independence between one column $E_j$ and the other column Ex in the selected two columns.

As the measure of independence, for example, the determination unit 68 calculates any value of a correlation coefficient, a rank correlation coefficient, a mutual information, a pairwise likelihood ratio, a distance correlation, a Hilbert-Schmidt independence criterion (HSIC), a maximal information coefficient (MIC), and a randomized dependence coefficient (RDC) between two columns corresponding to two variables in the exogenous noise matrix E', or a value obtained by combining two or more of such values. Note that a method of calculating a pairwise likelihood ratio is disclosed in Hyvarinen, A., & Smith, S. M., "Pairwise likelihood ratios for estimation of non-Gaussian structural equation models", published in 2013, The Journal of Machine Learning Research, 14 (1), pages 111 to 152. A method of calculating a distance correlation is disclosed in Szekely, G. J., Rizzo, M. L., & Bakirov, N. K., "Measuring and testing dependence by correlation of distances", published in 2007, Annals of Statistics, 35 (6), pages 2769 to 2794. A method of calculating HSIC is disclosed in Gretton, A., Borgwardt, K. M., Rasch, M. J., Scholkopf, B., & Smola, A., "A kernel two-sample test", published in 2005, Journal of Machine Learning Research, 6, pages 723 to 773. A method of calculating MIC is disclosed in Reshef, D. N., Reshef, Y. A., Finucane, H. K., Grossman, S. R., McVean, G., Turnbaugh, P. J., . . . & Sabeti, P. C., "Detecting novel associations in large data sets", published in 2011, Science, 334(6062), pages 1518 to 1524. A method of calculating RDC is disclosed in Lopez-Paz, D., Hennig, P., & Scholkopf, B., "The randomized dependence coefficient", published in 2013, Advances in neural information processing systems, page 26. The determination unit 68 may calculate a mutual information using a kernel method as the measure of independence. A mutual information using a kernel method is disclosed in Shimizu, S., Inazumi, T., Sogawa, Y., Hyvarinen, A., Kawahara, Y., Washio, T., & Hoyer, P. O., "DirectLiNGAM: A direct method for learning a linear non-Gaussian structural equation model", published in 2011, Journal of Machine Learning Research-JMLR, 12 (Apr), pages 1225 to 1248.

The determination unit 68 calculates such measure of independence for all combinations of two variables in the plurality of variables. Subsequently, based on the calculated measure of independence, the determination unit 68 determines whether the causal relationship of the plurality of variables represented by the one or more pieces of record data is different from the causal relationship of the plurality of variables represented by the pre-update model.

For example, for each combination of two variables in the plurality of variables, the calculated measure of independence is compared with a threshold, and it is determined whether the combinations of the two variables are independent of each other. As the threshold, for example, the determination unit 68 uses a preset value. As the threshold, the determination unit 68 may use a value determined by permutation test or bootstrap test, or a value obtained by performing multiple comparison correction on a preset value.

For example, when the calculated measure of independence is larger than the threshold, the determination unit 68 determines that the combinations of the two variables are independent of each other. The determination unit 68 determines that the combination of two variables is not independent, that is, one variable of the combination of two variables depends on the other variable when the calculated measure of independence is the threshold or less.

Subsequently, for example, the determination unit 68 determines whether the causal relationship of the plurality of variables represented by the one or more pieces of record data is different from the causal relationship of the plurality of variables represented by the pre-update model based on a comparison result between the measure of independence and the threshold for each combination of two variables in the plurality of variables.

For example, when it is determined that all combinations of two variables in a plurality of variables are independent, the determination unit 68 determines that there is no difference in causal relationships. Meanwhile, when it is determined that at least one of the combinations of two variables in the plurality of variables is not independent, the determination unit 68 determines that the causal relationships are different.

For example, when it is determined that combinations of a predetermined first ratio in all combinations of two variables in the plurality of variables are independent, the determination unit 68 may determine that the causal relationships are not different. Meanwhile, when it is determined that combinations of a predetermined second ratio in all combinations of two variables in the plurality of variables are not independent, the determination unit 68 may determine that the causal relationships are different. Note that the predetermined second ratio is a ratio obtained by subtracting the first ratio from the 100% ratio.

For example, when it is determined that all of a predetermined number of sets selected from a plurality of variables are independent, the determination unit 68 may determine that the causal relationships are not different. Meanwhile, when it is determined that at least one combination of the predetermined number of sets selected from the plurality of variables is not independent, the determination unit 68 may determine that the causal relationships are different.

For example, when it is determined that the combinations of the predetermined first ratio in the predetermined number of sets selected from the plurality of variables are independent, the determination unit 68 may determine that the causal relationships are not different. Meanwhile, when it is determined that the combinations of the predetermined second ratio in the predetermined number of sets selected from the plurality of variables are not independent, the determination unit 68 may determine that the causal relationships are different.

For example, the determination unit 68 integrates the measure of independence calculated for each combination of two variables in the plurality of variables into one statistical value and determines whether the causal relationship of the plurality of variables represented by one or more pieces of record data is different from the causal relationship of the plurality of variables represented by the pre-update model based on a comparison result between the statistical value and the threshold. The statistical value is, for example, a sum of all the independence indices or a product of all the independence indices. As the threshold, for example, the determination unit 68 uses a preset value. As the threshold, the determination unit 68 may use a value determined by a permutation test or a value obtained by performing multiple comparison correction on a preset value.

For example, when the correlation coefficient is used as the independence index, the determination unit 68 uses Bartlett's test of sphericity, a permutation test, or a bootstrap test to determine whether the statistical value of the correlation matrix is equal to the statistical value of the unit matrix, and determines whether the causal relationship of the plurality of variables represented by one or more pieces of record data is different from the causal relationship of the plurality of variables represented by the pre-update model. As the statistical value, for example, a determinant of a correlation matrix, a logarithm of a determinant, a norm, a maximum eigenvalue, or a trace is used.

The learning unit 70 acquires a determination result as to whether the causal relationships are different by the determination unit 68. The learning unit 70 performs learning processing based on the record data matrix X' stored in the data storage unit 64 and generates the post-update model that is the structural causal model when the determination unit 68 determines that the causal relationships are different.

In the present embodiment, the learning unit 70 includes a first level learning unit 82, a second level learning unit 84, and a third level learning unit 86. The first level learning unit 82, the second level learning unit 84, and the third level learning unit 86 perform learning processing based on one or more pieces of record data stored in the data storage unit 64 using learning models different from each other and generate a post-update model. The learning unit 70 may include any one or any two of the first level learning unit 82, the second level learning unit 84, and the third level learning unit 86.

The first level learning unit 82 estimates a new value corresponding to a nonzero element in the adjacency matrix B of the pre-update model stored in the model storage device 50 using linear regression based on the one or more pieces of record data stored in the data storage unit 64 when it is determined that the causal relationships are different. Then, the first level learning unit 82 generates the post-update model by updating the value of the nonzero element in the adjacency matrix B of the pre-update model to the estimated new value.

The post-update model generated by the first level learning unit 82 is represented by Formula (6).

$$X_k = \sum_{j\in\left(j:B_{jk}\neq 0\right)} X_j B'_{jk} + E_k,\ (k = 1, \ldots , d) \tag{6}$$

The first level learning unit 82 estimates $B_{jk}'$ in Formula (6) using linear regression such as a least squares method based on the record data matrix X'. The first level learning unit 82 may estimate $B_{jk}'$ in Formula (6) by regularized linear regression in which a difference between the adjacency matrix B of the pre-update model and the adjacency matrix B' of the post-update model is limited by a regularization term, such as Transfer Lasso disclosed in Takada, M., & Fujisawa, H., "Transfer Learning via 11 Regularization", published in 2020, Advances in Neural Information Processing Systems, 33, pages 14266 to 14277 when it is estimated that the difference in values is also small.

Note that the first level learning unit 82 may extract a set of two variables not determined to be dependent, that is, a column of a set of two variables determined to have a dependency relationship, and estimate $B_{jk}'$ in Formula (6) only for the extracted two or more variables. Here, the first level learning unit 82 causes a value corresponding to a variable not extracted in the adjacency matrix B' of the post-update model to be the same as a value of the adjacency matrix B of the pre-update model.

The first level learning unit 82 can generate the structural causal model according to the causal relationship of the plurality of variables represented by the one or more pieces of record data when the causal order and the causal structure in the plurality of variables represented by the one or more pieces of record data match the causal structure and the causal order in the plurality of variables represented by the pre-update model but the influences are different. That is, the first level learning unit 82 can generate the structural causal model according to the causal relationship of the plurality of variables represented by the one or more pieces of record data at the present time when the relationship of zero and nonzero is the same between the values of the elements in the adjacency matrix B, but the values are different.

The second level learning unit 84 generates the post-update model using regularized linear regression based on the one or more pieces of record data while causing the causal order to be the same as the adjacency matrix B of the pre-update model when it is determined that the causal relationships are different.

The post-update model generated by the second level learning unit 84 is represented by Formula (7).

$$X_k = \sum_{j=1}^{k-1} X_j B'_{ik} + E_k,\ (k = 1, \ldots, d) \tag{7}$$

The second level learning unit 84 estimates upper triangular components of $B_{jk}'$ in Formula (7) based on the record data matrix X'. For example, the second level learning unit 84 estimates the upper triangular components of $B_{jk}'$ in Formula (7) using Lasso or Adaptive Lasso. For example, the second level learning unit 84 may fix the causal order of the adjacency matrix B of the pre-update model and estimate an initial estimation amount of each of the upper triangular components of $B_{jk}'$ in Formula (7) using any of Adaptive Lasso, Transfer Lasso, or Adaptive Transfer Lasso. Adaptive Lasso is disclosed in Zou, H., "The adaptive lasso and its oracle properties", published in 2006, Journal of the American statistical association, 101 (476), pages 1418 to 1429. Adaptive Transfer Lasso is disclosed in Takada, M., & Fujisawa, H., "Adaptive Lasso, Transfer Lasso, and Beyond: An Asymptotic Perspective", published in 2024, arXiv preprint arXiv:2308.15838. Then, the second level learning unit 84 generates the post-update model using the estimated adjacency matrix B'.

Note that the second level learning unit 84 may extract a set of two variables not determined to be dependent, that is, a column of a set of two variables determined to have a dependency relationship, and estimate $B_{jk}'$ in Formula (7) only for the extracted two or more variables. Here, the second level learning unit 84 causes a value corresponding to a variable not extracted in the adjacency matrix B' of the post-update model to be the same as a value of the adjacency matrix B of the pre-update model.

The second level learning unit 84 can generate the structural causal model according to the causal relationship of the plurality of variables represented by the one or more pieces of record data when the causal order in the plurality of variables represented by the one or more pieces of record data matches the causal order in the plurality of variables represented by the pre-update model but the influences and the causal structures are different. That is, the second level learning unit 84 can generate the structural causal model according to the causal relationship in the plurality of variables represented by the one or more pieces of record data at the present time when the causal orders of the adjacency matrices B are the same, but the values are different including the relationship of zero and nonzero.

The third level learning unit 86 estimates the structural causal model including the causal order based on the one or more pieces of record data when it is determined that the causal relationships are different.

For example, the third level learning unit 86 generates the post-update model based on a causal discovery method based on non-Gaussianity. For example, the third level learning unit 86 may generate the post-update model based on ICA-LiNGAM or DirectLiNGAM. ICA-LINGAM is disclosed in Shimizu, S., Hoyer, P. O., Hyvarinen, A., Kerminen, A., & Jordan, M., "A linear non-Gaussian acyclic model for causal discovery", published in 2006, Journal of Machine Learning Research, 7 (10). DirectLiNGAM is disclosed in Shimizu, S., Inazumi, T., Sogawa, Y., Hyvarinen, A., Kawahara, Y., Washio, T., & Hoyer, P. O., "DirectLiNGAM: A direct method for learning a linear non-Gaussian structural equation model", published in 2011, Journal of Machine Learning Research-JMLR, 12 (Apr), pages 1225 to 1248.

Note that, when the adjacency matrix B' is estimated, the third level learning unit 86 may extract a set of two variables not determined to be dependent, that is, a column of a set of two variables determined to have a dependency relationship, and estimate $B_{jk}'$ only for the extracted two or more variables. Here, the third level learning unit 86 causes a value corresponding to a variable not extracted in the adjacency matrix B' of the post-update model to be the same as a value of the adjacency matrix B of the pre-update model.

Even when the causal relationship of the plurality of variables represented by the one or more pieces of record data is different from the causal relationship of the plurality of variables represented by the pre-update model in all of the magnitude of influence, the causal order, and the causal structure, the third level learning unit 86 can generate the structural causal model according to the causal relationship of the plurality of variables represented by the one or more pieces of record data at the present time.

The update model storage unit 72 stores the post-update model generated by the first level learning unit 82, the second level learning unit 84, and the third level learning unit 86.

The control unit 74 controls one of the first level learning unit 82, the second level learning unit 84, and the third level learning unit 86 to generate the structural causal model. For example, when it is determined that the causal relationships are different, the control unit 74 selects any one of the first level learning unit 82, the second level learning unit 84, and the third level learning unit 86 and the selected unit generates the structural causal model.

The control unit 74 may sequentially generate the structural causal models in the order of the first level learning unit 82, the second level learning unit 84, and the third level learning unit 86.

Here, after the first level learning unit 82 is caused to generate the structural causal model, the control unit 74 causes the estimation unit 66 to generate the exogenous noise matrix E' using the structural causal model generated by the first level learning unit 82 and causes the determination unit 68 to redetermine whether the causal relationships are different.

The control unit 74 causes, for the second time, the second level learning unit 84 to generate the structural causal model when it is determined that the causal relationships are different also for the structural causal model generated by the first level learning unit 82. Subsequently, the control unit 74 causes the estimation unit 66 to generate the exogenous noise matrix E' using the structural causal model generated by the second level learning unit 84 and causes the determination unit 68 to redetermine whether the causal relationships are different.

The control unit 74 causes, for the third time, the third level learning unit 86 to generate the structural causal model and ends the processing when it is determined that the causal relationships are different also for the structural causal model generated by the second level learning unit 84. When assumption of LiNGAM is satisfied, each column of the exogenous noise matrix E' is independent in the structural causal model generated by the third level learning unit 86. Therefore, in the structural causal model generated by the third level learning unit 86, even when the determination unit 68 redetermines whether the causal relationships are different, it is determined that the causal relationships are not different.

Note that the control unit 74 may generate the structural causal models in the order of the first level learning unit 82 and the third level learning unit 86. The control unit 74 may also generate the structural causal models in the order of the second level learning unit 84 and the third level learning unit 86.

The result output unit 76 outputs a determination result by the determination unit 68 as to whether the causal relationship of the plurality of variables represented by the one or more pieces of record data is different from the causal relationship of the plurality of variables represented by the pre-update model. For example, the result output unit 76 causes a display device or the like to display the determination result.

It is considered that the current causal relationship of the plurality of variables sampled from the target system 20 is changed from the original causal relationship when it is determined that the causal relationship of the plurality of variables sampled from the target system 20 is different from the causal relationship of the plurality of variables represented by the pre-update model stored in the model storage device 50.

Therefore, when the structural causal models are sequentially generated in the order of the first level learning unit 82, the second level learning unit 84, and the third level learning unit 86, the result output unit 76 may further determine the content of change in the causal relationship based on characteristics of learning models in respective levels and redetermination results of the difference in the causal relationships with respect to the structural causal models generated by the learning models in the respective levels. Then, the result output unit 76 may display a determination result representing the determined content of change in the causal relationship on, for example, a display device or the like.

For example, when it is determined that the causal relationships are not different for the pre-update model originally stored in the model storage device 50, it is determined that the current causal relationship of the plurality of variables sampled from the target system 20 is not changed or cannot be said to be changed from the original causal relationship. Therefore, when it is determined that the causal relationships are not different for the pre-update model originally stored in the model storage device 50, the result output unit 76 may cause the display device to display at least one piece of information from "no change in causal influence", "no change in causal structure", "no change in causal order", and the like.

Note that a change in causal influence indicates that the magnitude of influence between any two sets of variables of the plurality of variables is changed. A change in causal structure indicates that the structure of the causal relationship of the plurality of variables is changed. A change in the causal order indicates that the causal order of the plurality of variables is changed.

For example, when it is redetermined that the causal relationships are not different for the structural causal model generated by the first level learning unit 82, it is determined that the zero and nonzero positions in the adjacency matrix B of the current causal relationship of the plurality of variables sampled from the target system 20 is not changed from the original causal relationship, and the causal structure and the causal order are the same, but the values in the adjacency matrix B are changed, and the causal influence is different. Therefore, when it is redetermined that the causal relationships are not different for the structural causal model generated by the first level learning unit 82, the result output unit 76 may cause the display device to display at least one piece of information from "change in causal influence", "no change in causal structure", and "no change in causal order".

For example, when it is redetermined that the causal relationships are not different for the structural causal model generated by the second level learning unit 84, it is determined that the current causal relationship of the plurality of variables sampled from the target system 20 is the same in the causal order but have different causal influence and different causal structure from the original causal relationship. Therefore, when it is redetermined that the causal relationships are not different for the structural causal model generated by the second level learning unit 84, the result output unit 76 may cause the display device to display at least one piece of information from "change in causal influence", "change in causal structure", and "no change in causal order".

For example, when it is redetermined that the causal relationships are different for the structural causal model generated by the third level learning unit 86, it is determined that the current causal relationship of the plurality of variables sampled from the target system 20 is different in all of the causal influence, the causal structure, and the causal order from the original causal relationship. Therefore, when it is redetermined that the causal relationships are different for the structural causal model generated by the second level learning unit 84, the result output unit 76 may cause the display device to display at least one piece of information from "change in causal influence", "change in causal structure", and "change in causal order".

Note that, for example, even when the structural causal models are sequentially generated in the order of the first level learning unit 82 and the third level learning unit 86, the result output unit 76 may cause the display device to display similar information. For example, even when the structural causal models are sequentially generated in the order of the second level learning unit 84 and the third level learning unit 86, the result output unit 76 may cause the display device to display similar information.

After learning by the learning unit 70 is completed, the update unit 78 reads the generated structural causal model from the update model storage unit 72 and stores the structural causal model in the model storage device 50.

Figure 8:
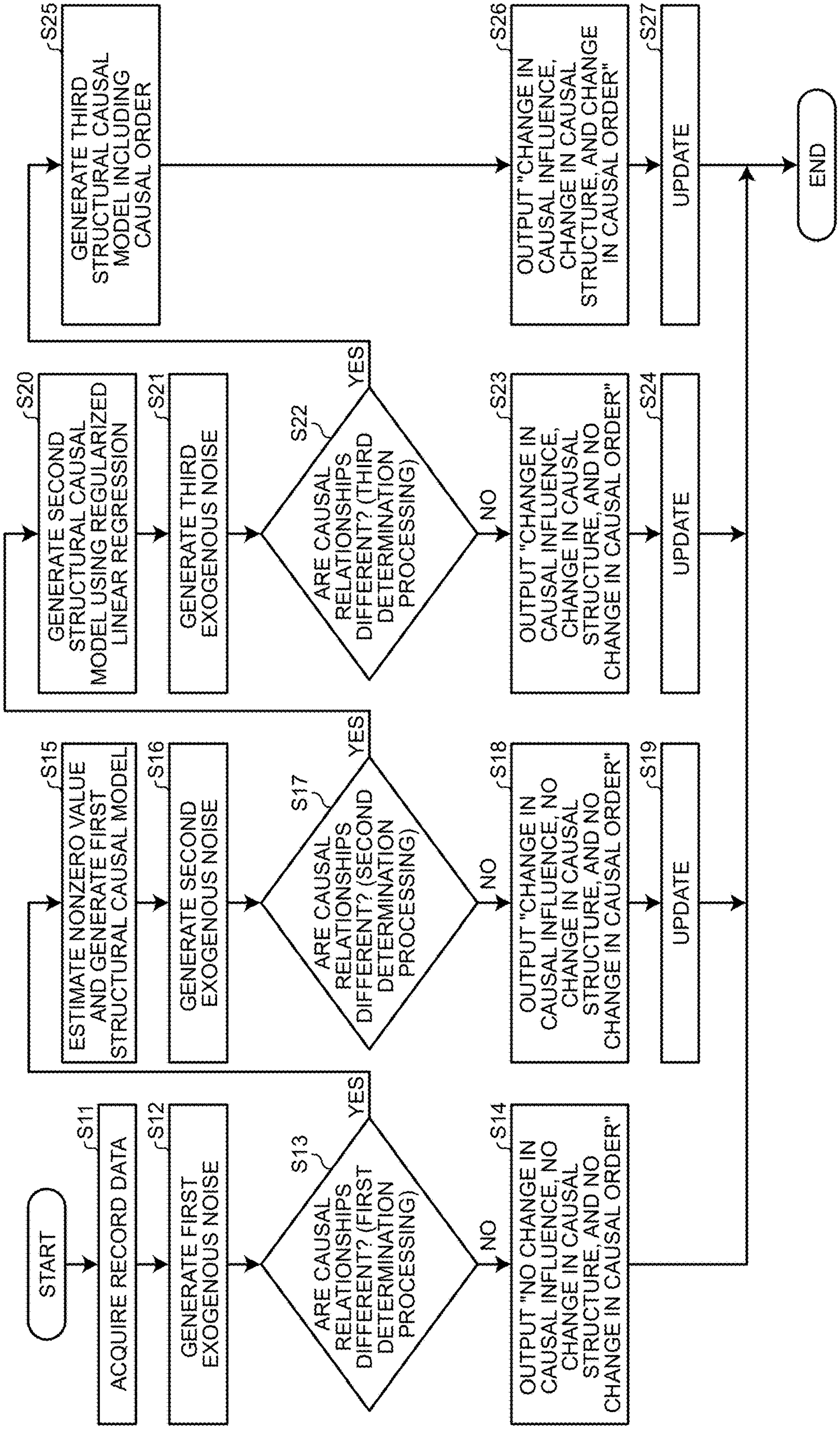
FIG. 8 is a flowchart illustrating a flow of processing of the model update device.

FIG. 8 is a flowchart illustrating a flow of processing of the model update device 60 when the structural causal models are sequentially generated in the order of the first level learning unit 82, the second level learning unit 84, and the third level learning unit 86. The model update device 60 may execute the processing in the flow illustrated in FIG. 8, for example.

First, in S11, the model update device 60 acquires one or more pieces of record data.

Subsequently, in S12, the model update device 60 generates a plurality of first exogenous noise estimation values, that are a plurality of exogenous noise estimation values for each of the one or more pieces of record data, based on the one or more pieces of record data and the pre-update model.

Subsequently, in S13, the model update device 60 executes first determination processing of determining whether the causal relationship of the plurality of variables represented by the one or more pieces of record data is different from the causal relationship of the plurality of variables represented by the pre-update model based on the independence between any two variables in the plurality of first exogenous noise estimation values for each of the one or more pieces of record data. The model update device 60 proceeds the processing to S14 when it is determined that the causal relationships are not different in the first determination processing (No in S13) and proceeds the processing to S15 when it is determined that the causal relationships are different in the first determination processing (Yes in S13).

In S14, the model update device 60 outputs information indicating "no change in causal influence", "no change in causal structure", and "no change in causal order". The model update device 60 may output any one or two pieces of information from "no change in causal influence", "no change in causal structure", and "no change in causal order". When the processing of S14 is completed, the model update device 60 ends the present flow.

In S15, the model update device 60 estimates a new value corresponding to a nonzero element in the adjacency matrix B of the pre-update model using linear regression based on one or more pieces of record data. Then, the model update device 60 generates the first structural causal model that is the structural causal model by updating the value of the nonzero element in the adjacency matrix B of the pre-update model to the estimated new value. For example, the model update device 60 generates the first structural causal model by the first level learning unit 82.

Subsequently, in S16, the model update device 60 generates a plurality of second exogenous noise estimation values, that are a plurality of exogenous noise estimation values for each of the one or more pieces of record data, based on the one or more pieces of record data and the first structural causal model.

Subsequently, in S17, the model update device 60 executes second determination processing of determining whether the causal relationship of the plurality of variables represented by the one or more pieces of record data is different from the causal relationship of the plurality of variables represented by the first structural causal model based on the independence between any two variables in the plurality of second exogenous noise estimation values for each of the one or more pieces of record data. The model update device 60 proceeds the processing to S18 when it is determined that the causal relationships are not different in the second determination processing (No in S17) and proceeds the processing to S20 when it is determined that the causal relationships are different in the second determination processing (Yes in S17).

In S18, the model update device 60 outputs information indicating "change in causal influence", "no change in causal structure", and "no change in causal order". The model update device 60 may output any one or two pieces of information from "change in causal influence", "no change in causal structure", and "no change in causal order".

Subsequent to S18, in S19, the model update device 60 updates the structural causal model stored in the model storage device 50 using the first structural causal model as the post-update model. When the processing of S19 is completed, the model update device 60 ends the present flow.

In S20, the model update device 60 generates the second structural causal model using regularized linear regression based on the one or more pieces of record data so that the causal order is the same as the adjacency matrix B of the pre-update model. For example, the model update device 60 generates the first structural causal model by the second level learning unit 84.

Subsequently, in S21, the model update device 60 generates a plurality of third exogenous noise estimation values, that are a plurality of exogenous noise estimation values for each of the one or more pieces of record data, based on the one or more pieces of record data and the second structural causal model.

Subsequently, in S22, the model update device 60 executes third determination processing of determining whether the causal relationship of the plurality of variables represented by the one or more pieces of record data is different from the causal relationship of the plurality of variables represented by the second structural causal model based on the independence between any two variables in the plurality of third exogenous noise estimation values for each of the one or more pieces of record data. The model update device 60 proceeds the processing to S23 when it is determined that the causal relationships are not different in the third determination processing (No in S22) and proceeds the processing to S25 when it is determined that the causal relationships are different in the second determination processing (Yes in S22).

In S23, the model update device 60 outputs information indicating "change in causal influence", "change in causal structure", and "no change in causal order". The model update device 60 may output any one or two pieces of information from "change in causal influence", "change in causal structure", and "no change in causal order".

Subsequent to S23, in S24, the model update device 60 updates the structural causal model stored in the model storage device 50 using the second structural causal model as the post-update model. When the processing of S24 is completed, the model update device 60 ends the present flow.

In S25, the model update device 60 generates the third structural causal model that is the structural causal model including the causal order based on the one or more pieces of record data. For example, the model update device 60 generates the third structural causal model by a third level learning unit 85.

Subsequently, in S26, the model update device 60 outputs information indicating "change in causal influence", "change in causal structure", and "change in causal order". The model update device 60 may output any one or two pieces of information from "change in causal influence", "change in causal structure", and "change in causal order".

Subsequent to S26, in S27, the model update device 60 updates the structural causal model stored in the model storage device 50 using the third structural causal model as the post-update model. When the processing of S26 is completed, the model update device 60 ends the present flow.

Note that the model update device 60 may proceed the processing to S25 when it is determined that the causal relationships are different by the second determination processing (Yes in S17) without executing the processing from S20 to S24. As a result, the model update device 60 can generate the structural causal models in the order of the first level learning unit 82 and the third level learning unit 86.

Also, the model update device 60 may proceed the processing to S20 when it is determined that the causal relationships are different by the first determination processing (Yes in S13) without executing the processing from S15 to S19. As a result, the model update device 60 can generate the structural causal models in the order of the second level learning unit 84 and the third level learning unit 86.

As described above, the model update device 60 generates a plurality of new structural causal models, each of which is a structural causal model based on one or more pieces of record data using learning models in a plurality of levels. In each of the plurality of new structural causal models, the model update device 60 generates a plurality of exogenous noise estimation values for each of one or more pieces of record data and determines whether the causal relationships are different. Then, the model update device 60 outputs information indicating how the causal relationship of the plurality of variables represented by the one or more pieces of record data is changed based on the learning model used for generation and a determination result as to whether the causal relationships are different. Specifically, the model update device 60 determines at least one of whether the causal influence is changed, whether the causal structure is changed, and whether the causal order is changed and outputs the determination result.

FIG. 9 is a diagram illustrating an example of information output from the model update device 60. The model update device 60 may cause the display device to display the determination result as to whether the causal influence is changed, whether the causal structure is changed, and whether the causal order is changed by text as shown in FIG. 9.

FIG. 10 is a diagram illustrating an example of the adjacency matrix B' of the post-update model. The model update device 60 may cause the display device to display the adjacency matrix B' after update in a tabular form as illustrated in FIG. 10.

Figures 11, 12:
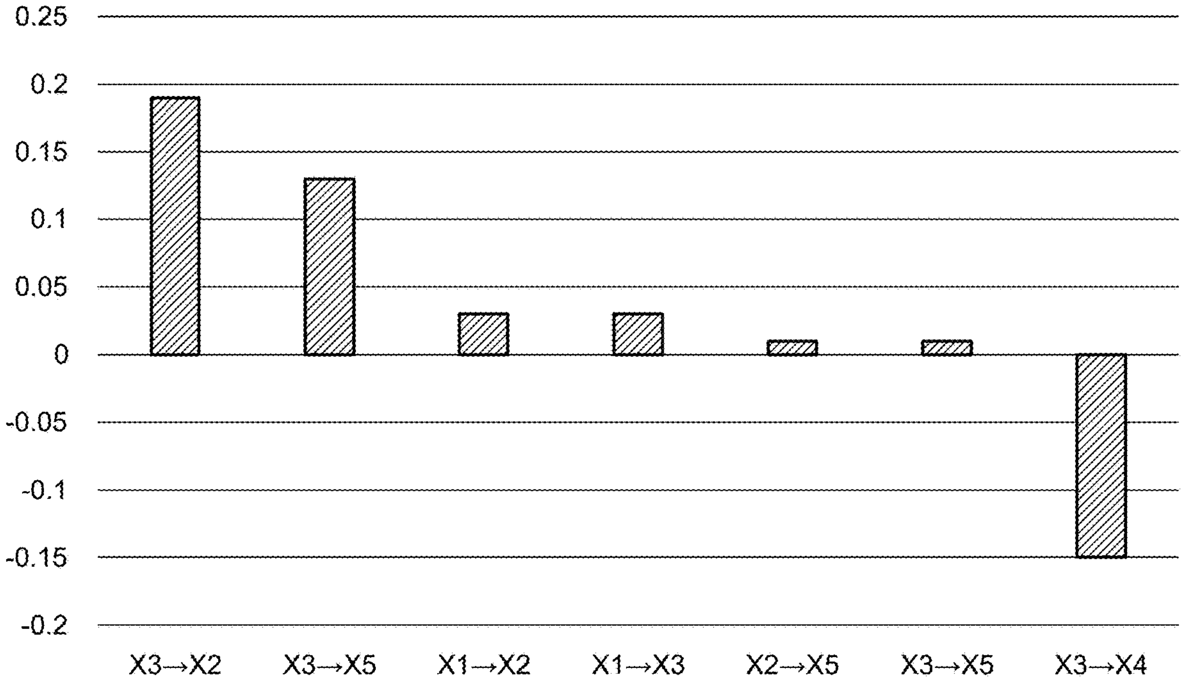
FIG. 11 is a diagram illustrating a difference matrix between adjacency matrices before and after update.
FIG. 12 is a diagram illustrating a bar graph representing a difference between adjacency matrices before and after update.

FIG. 11 is a diagram illustrating an example of a difference matrix between the adjacency matrix B of the pre-update model and the adjacency matrix B' of the post-update model.

When the structural causal model is updated, the model update device 60 may calculate a difference matrix by calculating a difference between the adjacency matrix B used for the pre-update model and the adjacency matrix B' used for the post-update model. Then, the model update device 60 may cause the display device to display the generated difference matrix in a tabular form to output the difference matrix.

The model update device 60 may use an image in which a background of a cell in the table is highlighted according to a magnitude of a numerical value. That is, a display control unit 54 may change a degree of highlight of the cell according to the magnitude of the numerical value in the cell to display the table as a heat map. The model update device 60 may change a type of highlight such as a color or a thickness of the cell according to positive or negative of a change, a magnitude of an absolute value, a change of zero or nonzero, a change in a direction of cause and effect, and the like.

FIG. 12 is a diagram illustrating an example of a bar graph representing a difference between the adjacency matrix B of the pre-update model and the adjacency matrix B' of the post-update model.

When the structural causal model is updated, the model update device 60 may calculate a difference for each set of two variables and display the calculated difference by the bar graph as illustrated in FIG. 12. Here, the model update device 60 may sort the set of two variables according to a magnitude of difference and display the sorted set on the bar graph.

Figure 13:
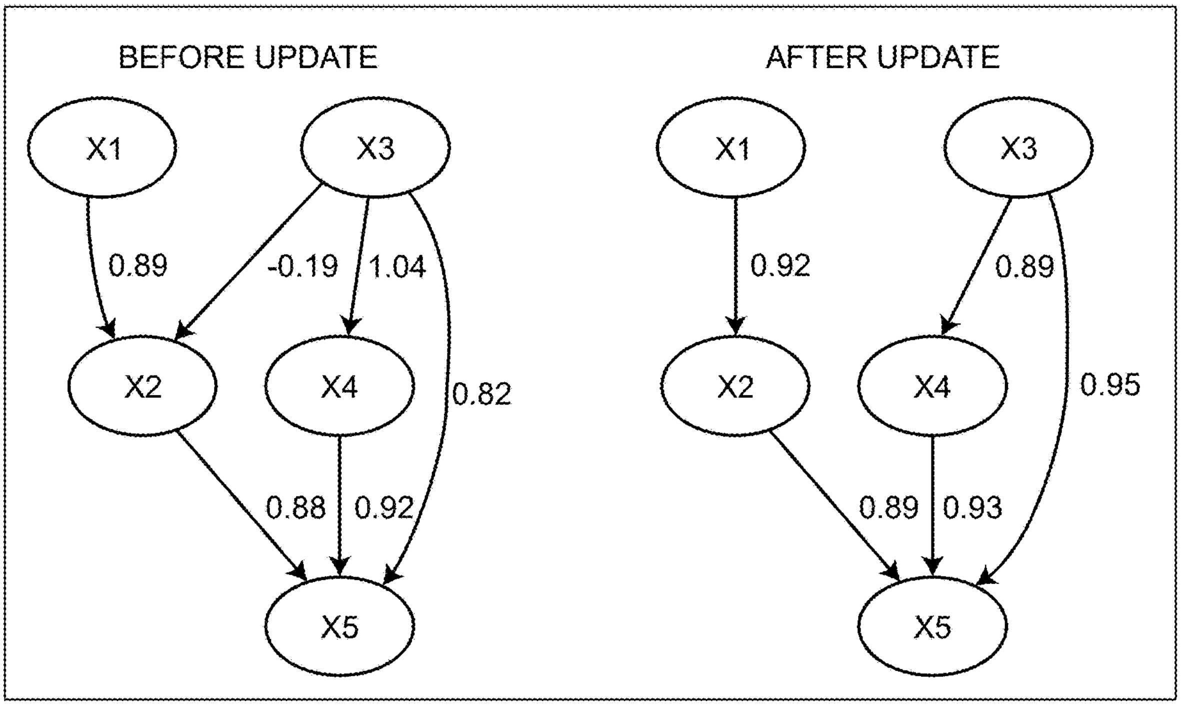
FIG. 13 is a diagram illustrating a display example of a causal graph before and after update.

FIG. 13 is a diagram illustrating a display example of the causal graph of the pre-update model and the causal graph of the post-update model.

When the structural causal model is updated, the model update device 60 may display the causal graph of the pre-update model and the causal graph of the post-update model side by side as illustrated in FIG. 13. Here, the model update device 60 may display the causal graph of the pre-update model and the causal graph of the post-update model so that the positional relationships of the nodes are the same. As a result, the model update device 60 can indicate the difference in the graph structure to be visually recognized.

Figure 14:
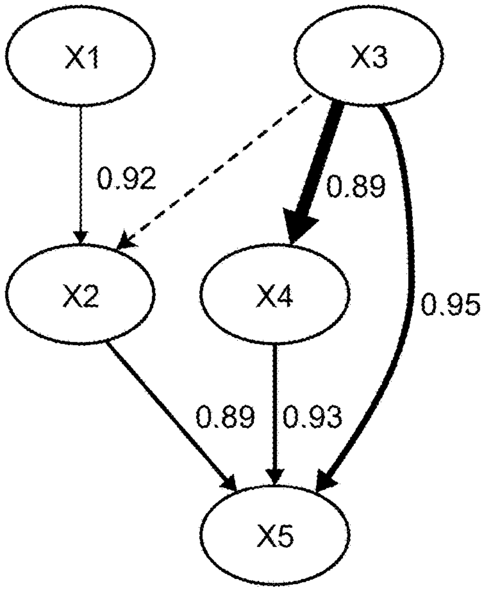
FIG. 14 is a diagram illustrating a display example of a causal graph of the post-update model.

FIG. 14 is a diagram illustrating a display example of the causal graph of the post-update model.

When the structural causal model is updated, the model update device 60 may display the causal graph of the post-update model as illustrated in FIG. 14. Here the model update device 60 may change a style of an edge such as a color or a thickness of the edge according to the difference from the causal graph of the pre-update model. The model update device 60 may add an edge that exists in the pre-update model but does not exist in the post-update model by, for example, a dotted line or the like. The model update device 60 may add a numerical value to the edge, the value representing a change amount from the pre-update model. As a result, the model update device 60 can indicate changes in the causal influence, the causal structure, and the causal order to be visually recognized. The causal graph of the difference between the pre-update model and the post-update model may be displayed.

As described above, in the model update device 60 according to the present embodiment, the model update device 60 determines whether the causal relationship of the plurality of variables sampled from the target system 20 is different from the causal relationship of the plurality of variables represented by the structural causal model stored in the model storage device 50 based on the independence between two or more variables in the plurality of exogenous noise estimation values. For example, the model update device 60 determines whether the causal relationship of the plurality of variables sampled from the target system 20 is changed based on the independence between two or more variables in the plurality of exogenous noise estimation values.

According to the model update device 60, it is possible to appropriately update the structural causal model according to a change in the causal relationship of the plurality of variables sampled from the target system 20.

The model update device 60 sequentially generates structural causal models using a plurality of different learning models when it is determined that the causal relationships are different and further performs determination on the generated structural causal models based on independence between two or more variables in the plurality of exogenous noise estimation values. Then, the model update device 60 outputs information indicating which of the causal influence, the causal structure, and the causal order in the structural causal model is changed from the relationship between the learning model and the determination result.

The device in the related art can relearn and generate the adjacency matrix B from the record data by the causal discovery method without detecting changes in the causal influence, the causal structure, and the causal order. However, in cases such as the number of samples of the record data is small, noise is large, or noise is close to Gaussian distribution, the adjacency matrix B generated by relearning has low stability and reliability. It is difficult to determine whether the causal influence is changed, whether the causal structure is changed, and whether the causal order is changed, and to analyze the content of change from the adjacency matrix B having low stability and reliability. However, according to the model update device 60 according to the present embodiment, the structural causal models are sequentially generated using the plurality of learning models, and determination is further performed for each of the plurality of generated structural causal models based on the independence between the two variables in the plurality of exogenous noise estimation values, so that it is possible to stably detect changes in the causal influence, the causal structure, and the causal order of the plurality of variables sampled from the target system 20 with high reliability.

Wang, Y., Squires, C., Belyaeva, A., & Uhler, C., "Direct estimation of differences in causal graphs", published in 2018, Advances in neural information processing systems, page 31 and Ghoshal, A., Bello, K., & Honorio, J., "Direct learning with guarantees of the difference dag between structural equation models" published in 2019, arXiv preprint arXiv:1906.12024 disclose techniques for learning a difference between causal models from two pieces of data. In the techniques disclosed in Wang, Y., Squires, C., Belyaeva, A., & Uhler, C., "Direct estimation of differences in causal graphs", published in 2018, Advances in neural information processing systems, page 31 and Ghoshal, A., Bello, K., & Honorio, J., "Direct learning with guarantees of the difference dag between structural equation models" published in 2019, arXiv preprint arXiv:1906.12024, two pieces of data are input and a difference between adjacency matrices B is output. Algorithms of the techniques disclosed in Wang, Y., Squires, C., Belyaeva, A., & Uhler, C., "Direct estimation of differences in causal graphs", published in 2018, Advances in neural information processing systems, page 31 and Ghoshal, A., Bello, K., & Honorio, J., "Direct learning with guarantees of the difference dag between structural equation models" published in 2019, arXiv preprint arXiv:1906.12024 use techniques of testing a difference of an accuracy matrix or a regression difference. Meanwhile, the model update device 60 according to the present embodiment inputs one or more pieces of record data and the adjacency matrix B and outputs the adjacency matrix B or a determination result of a change in the adjacency matrix B. Then, the model update device 60 uses an algorithm for calculating the independence between two or more variables in the plurality of exogenous noise estimation values. Therefore, the model update device 60 has an advantage that it is possible to output the adjacency matrix B' after update without inputting the original data and by inputting one or more pieces of new record data to be analyzed and the adjacency matrix B before update. When non-Gaussianity is satisfied, there is an advantage that the model update device 60 can estimate the causal order and the adjacency matrix B from only one or more pieces of new record data, that is, identification of the adjacency matrix B is guaranteed.

Chen, T., Bello, K., Aragam, B., & Ravikumar, P., "iSCAN: Identifying Causal Mechanism Shifts among Nonlinear Additive Noise Models", published in 2024, Advances in Neural Information Processing Systems, page 36 discloses a technique for learning a difference between causal models from two pieces of data. The technique disclosed in Chen, T., Bello, K., Aragam, B., & Ravikumar, P., "iSCAN: Identifying Causal Mechanism Shifts among Nonlinear Additive Noise Models", published in 2024, Advances in Neural Information Processing Systems, page 36 inputs two pieces of data and outputs a difference between adjacency matrices B. An algorithm of the technique disclosed in Chen, T., Bello, K., Aragam, B., & Ravikumar, P., "iSCAN: Identifying Causal Mechanism Shifts among Nonlinear Additive Noise Models", published in 2024, Advances in Neural Information Processing Systems, page 36 uses Hessian of log likelihood and conditional independence. In the technique disclosed in Chen, T., Bello, K., Aragam, B., & Ravikumar, P., "iSCAN: Identifying Causal Mechanism Shifts among Nonlinear Additive Noise Models", published in 2024, Advances in Neural Information Processing Systems, page 36, identification is guaranteed when nonlinearity is satisfied. Meanwhile, the model update device 60 according to the present embodiment has an advantage that it is possible to output the adjacency matrix B' after update without inputting the original data and by inputting one or more pieces of new record data to be analyzed and the adjacency matrix B before update. The model update device 60 has an advantage that the identification of the adjacency matrix B is guaranteed when non-Gaussianity is satisfied.

Figure 15:
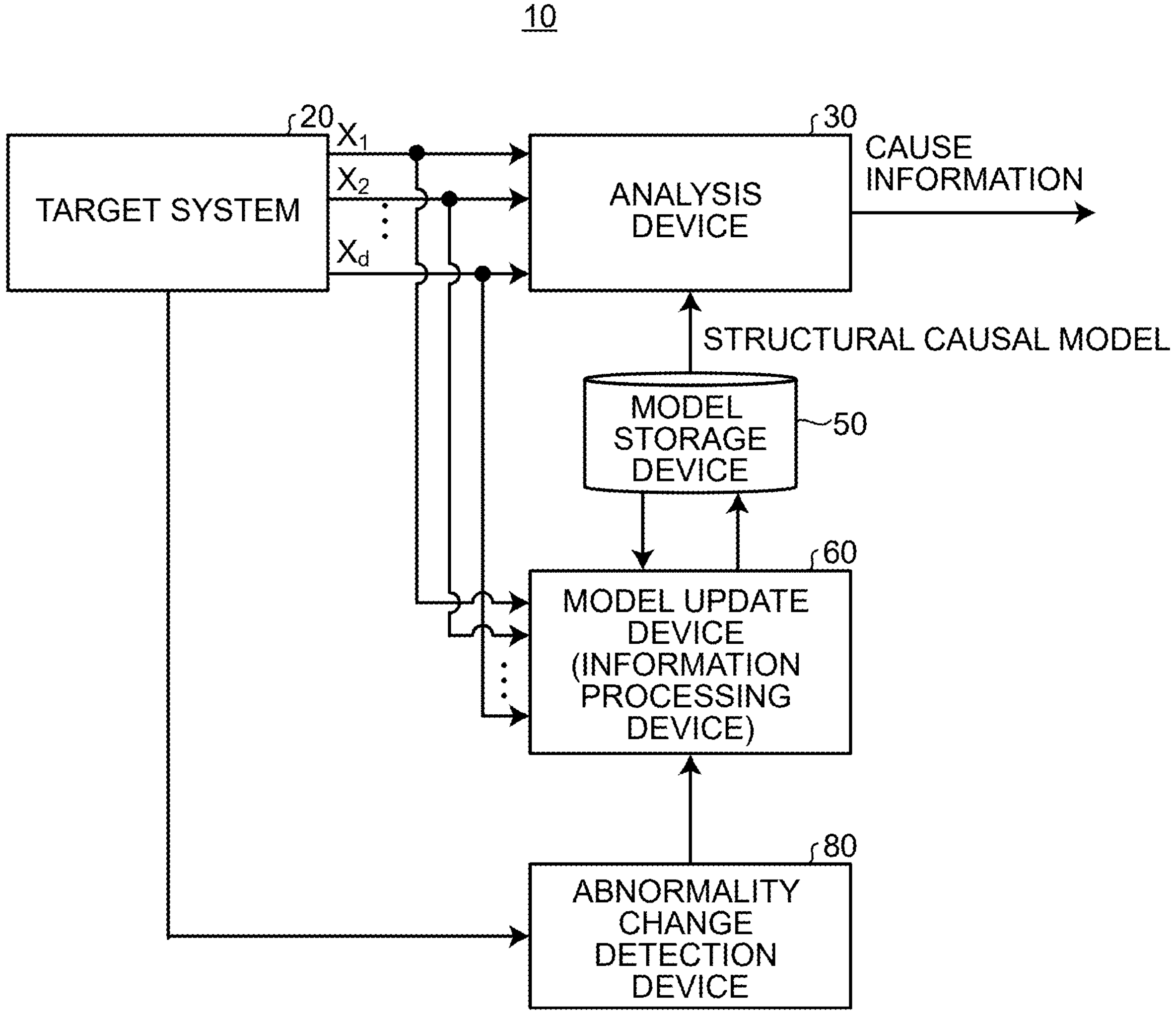
FIG. 15 is a diagram illustrating a modification of the information processing system according to the embodiment.

FIG. 15 is a diagram illustrating a modification of the information processing system 10 according to the embodiment. The information processing system 10 according to the modification further includes an analysis device 30 and an abnormality change detection device 80.

For example, as a stationary task, the model update device 60 periodically acquires one or more pieces of record data including record values of a plurality of variables, determines whether the record data is different from the causal relationship, and performs a series of processing of updating the structural causal model when it is determined that the causal relationships are different. Instead of or in addition to the processing, the model update device 60 according to the modification performs a series of processing as a nonstationary task in response to an instruction from the abnormality change detection device 80.

The analysis device 30 is an information processing device that executes information processing. The analysis device 30 acquires one or more pieces of record data each including a plurality of record values corresponding to a plurality of variables from the target system 20. Before the processing, the structural causal model stored in the model storage device 50 is given to the analysis device 30, and the structural causal model is set. The analysis device 30 generates cause information indicating a cause of a change of at least one variable among the plurality of variables based on the acquired one or more pieces of record data and the preset structural causal model. Then, the analysis device 30 outputs the cause information, for example, by performing display or the like.

In the present embodiment, the analysis device 30 acquires record data of n samples (n is an integer of 1 or more). Each of the one or more pieces of record data in the present embodiment is assigned with an index for identifying conditions such as sampled time.

The analysis device 30 can output cause information indicating a direct cause and an indirect cause of a change in a variable using the structural causal model.

The abnormality change detection device 80 acquires one or more pieces of record data and the like and detects occurrence of abnormality or possibility of abnormality in the target system 20 or a change in the state of the target system 20. The abnormality change detection device 80 gives an operation instruction to the model update device 60 when a change in the state of the target system 20 is detected. For example, the abnormality change detection device 80 may determine the state of the target system 20 by comparing a quantile, a standard deviation, and the like in the record value of any variable to be monitored among the plurality of variables with a preset threshold. For example, the abnormality change detection device 80 may determine the state of the target system 20 by testing an average value, a standard deviation, and the like in the record value of the variable to be monitored. For example, the abnormality change detection device 80 may individually determine each of two or more variables to be monitored among the plurality of variables, and may determine that there is an abnormality, a change, or an abnormality and a change in the state of the target system 20 when any of the two or more variables to be monitored or a predetermined number thereof is detected.

The abnormality change detection device 80 may collectively perform multivariate analysis on any two or more variables to be monitored among the plurality of variables to determine the state of the target system 20. For example, the abnormality change detection device 80 may determine the state of the target system 20 using a method based on Hotelling's Statistic, k-NN, SVM, CAE, a graphical model, a density ratio, and the like for two or more variables to be monitored.

By including the abnormality change detection device 80, the information processing system 10 can support a work of identifying a factor of generation of the abnormality, the change, or the abnormality and the change detected by the abnormality change detection device 80.

When the target system 20 is a system that manufactures a product, the target system 20 monitors and manages quality characteristics of the product using a control chart. The control chart includes information defining control limits or specification limits of values representing quality characteristics of a product.

Here, the plurality of variables include quality characteristics of the product defined in the control chart as variables. The structural causal model updated by the model update device 60 includes the quality characteristics of the product defined in the control chart as variables.

The abnormality change detection device 80 causes the model update device 60 to execute processing when the record value of the variable representing the quality characteristic of the product deviates from the control limits or the specification limits. Then, when the quality characteristic of the product deviates from the control limits and the specification limits shown in the control chart, the model update device 60 acquires one or more pieces of record data including record values of a plurality of variables, determines whether the record data is different from the causal relationship, and performs a series of processing of updating the structural causal model when it is determined that the causal relationships are different. As a result, a user can combine information indicating the structural causal model updated by the model update device 60 and the content of change with the control chart to perform the cause investigation and the countermeasure examination.

Analysis Device 30

Figure 16:
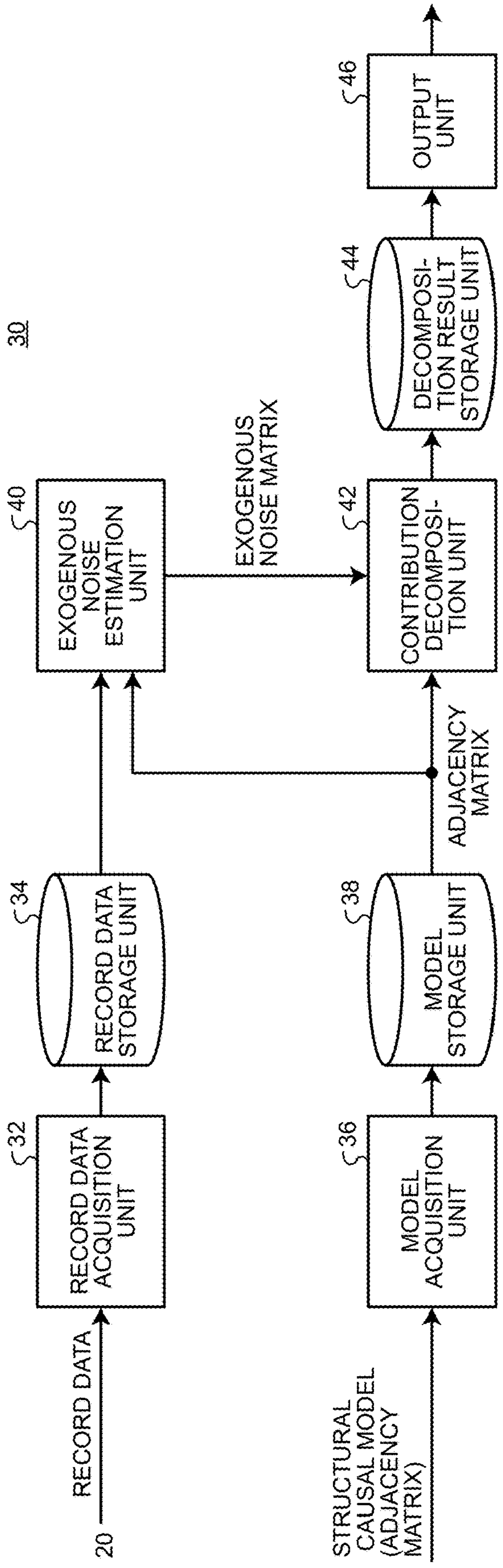
FIG. 16 is a configuration diagram of an analysis device.

FIG. 16 is a diagram illustrating an example of a configuration of the analysis device 30.

For example, the analysis device 30 may have a configuration as illustrated in FIG. 16. The analysis device 30 includes a record data acquisition unit 32, a record data storage unit 34, a model acquisition unit 36, a model storage unit 38, an exogenous noise estimation unit 40, a contribution decomposition unit 42, a decomposition result storage unit 44, and an output unit 46.

The record data acquisition unit 32 acquires one or more pieces of record data from the target system 20. In the present embodiment, the record data acquisition unit 32 acquires record data including d record values corresponding to d variables for n samples.

The record data storage unit 34 stores the acquired one or more pieces of record data. In the present embodiment, the record data storage unit 34 stores the record data matrix X'.

The model acquisition unit 36 acquires the structural causal model from the model storage device 50. In the present embodiment, the model acquisition unit 36 acquires the adjacency matrix B' from the model storage device 50.

The model storage unit 38 stores the structural causal model acquired by the model acquisition unit 36. In the present embodiment, the model storage unit 38 stores the adjacency matrix B'.

The exogenous noise estimation unit 40 calculates the plurality of exogenous noise estimation values corresponding to the plurality of variables for each of the one or more pieces of record data based on the one or more pieces of record data stored in the record data storage unit 34 and the structural causal model acquired by the model acquisition unit 36. Note that the exogenous noise estimation unit 40 may use the exogenous noise estimation values estimated by the estimation unit 60.

In the present embodiment, the exogenous noise estimation unit 40 calculates the exogenous noise matrix E' by Formula (8).

$$E' = X'(I - B') \tag{8}$$

The contribution decomposition unit 42 generates a degree of contribution representing a magnitude of influence on a target variable that is one of two variables by an exogenous noise given to a source variable that is the other of the two variables for each combination of two variables in the plurality of variables in each of the one or more pieces of record data based on the structural causal model and the plurality of exogenous noise estimation values for each of the one or more pieces of record data.

Hereinafter, the degree of contribution is further described.

When Formula (8) is transformed, the record data matrix X' is expressed as Formula (9).

$$X' = E'(I - B')^{-1} \tag{9}$$

When $(I-B')^{-1}$ is defined as a coefficient matrix A, the record data matrix X' is expressed by Formula (10).

$$X' = E'A \tag{10}$$

When the causal graph is an acyclic graph, by appropriately rearranging the order of variables, the adjacency matrix B becomes a strict upper triangular matrix having diagonal components of 0. Therefore, (I−B') has an inverse matrix. That is, the coefficient matrix $A=(I-B')^{-1}$, that is an inverse matrix of (I−B), is an upper triangular matrix having diagonal components of 1. Note that the order of the plurality of variables when arranged as such is referred to as a causal order. It is likely that a causal graph representing a structural causal model includes a directed edge from a node corresponding to a variable of any first rank in the causal order to a node corresponding to a variable of any second rank greater than the first rank in the causal order. However, the causal graph does not include a directed edge from the node corresponding to the variable of the second rank to the node corresponding to the variable of the first rank.

When the causal graph is not an acyclic graph, (I–B') does not necessarily have an inverse matrix. Therefore, the coefficient matrix A may be $(I-B')^+$, that is a generalized inverse matrix, instead of $(I-B')^{-1}$.

An element in an i-th row and a k-th column (k is an integer of 1 or more and d or less) in X'=E'A is $x_{ik}$. $x_{ik}$ is expressed as Formula (11).

$$x_{ik} = \sum_{j=1}^{k-1} A_{jk} e_{ij} + \hat{e}_{ik} \tag{11}$$

$x_{ik}$ expressed by Formula (11) represents a record value of a variable having the index of k among the d variables in record data of a sample having the index of i among the n samples.

The right side of Formula (11) is a linear sum formula that sums up a plurality of terms. That is, $x_{ik}$ is expressed by a linear sum formula that sums up a plurality of terms.

The linear sum formula on the right side of Formula (11) includes (k–1) $A_{jk}e_{ij}$ terms and one $e_{ik}$ term.

$e_{ik}$ represents a value of an element of an i-th row and a k-th column in the exogenous noise matrix E'. That is, $e_{ik}$ is an exogenous noise estimation value representing an exogenous noise given to a variable having the index of k in record data of a sample having the index of i.

$e_{ij}$ represents a value of an element of an i-th row and a j-th column in the exogenous noise matrix E'. That is, $e_{ij}$ is an exogenous noise estimation value representing an exogenous noise given to a variable having the index of j in the record data of the sample having the index of i.

$A_{jk}$ represents a value of an element of a j-th row and a k-th column in the coefficient matrix $A=(I-B')^{-1}$.

Here, in Formula (11), the variable having the index of j is positioned upstream of the variable having the index of k on the causal graph. That is, the variable having the index of j has a smaller causal order than the variable having the index of k. Therefore, $e_{ij}$ is an exogenous noise estimation value representing the exogenous noise given to the variable that is likely to directly influence $x_{ik}$ or an exogenous noise estimation value representing the exogenous noise given to the variable that is likely to indirectly influence $x_{ik}$, $x_{ik}$ being the record value of the variable having the index of k in the sample having the index of i.

That is, $A_{jk}e_{ij}$ in the linear sum formula on the right side of Formula (11) represents an influence of the exogenous noise given to the variable that is likely to directly or indirectly influence $x_{ik}$ that is the record value of the variable having the index of k in the sample having the index of i.

Note that, when the adjacency matrix B' is a strict upper triangular matrix with diagonal components of 0, the coefficient matrix A is an upper triangular matrix with diagonal components of 1 and with a lower side of the diagonal components of 0. Therefore, here, Formula (11) may be expressed as Formula (12).

$$x_{ik} = \sum_{j=1}^{d} A_{jk} e_{ij} \tag{12}$$

The linear sum formula on the right side of Formula (12) is a formula that sums up values obtained by multiplying each of $e_{ij}$ that is a plurality of exogenous noise estimation values in the record data of the sample having the index of i by the corresponding coefficient $A_{jk}$ in the coefficient matrix A. That is, the linear sum formula on the right side of Formula (12) is a formula for performing the product-sum operation of a row corresponding to the record data of the sample having the index of i in the exogenous noise matrix E' and a column corresponding to the variable having the index of k in the coefficient matrix A. However, since the coefficient matrix A is an upper triangular matrix in which the lower side of the diagonal components is 0, $A_{jk}e_{ij}$ in the linear sum formula of the right side of Formula (12) is 0 when j is larger than k.

The contribution decomposition unit 42 generates $A_{jk}e_{ij}$ expressed by Formula (11) or Formula (12) as a degree of contribution for each combination of two variables in the plurality of variables for each of the one or more pieces of record data. That is, the contribution decomposition unit 42 generates $A_{jk}e_{ij}$ in the linear sum formula on the right side of Formula (11) or Formula (12) as the degree of contribution of the exogenous noise given to $x_{ik}$ that is the variable having the index of k in the sample having the index of i with respect to $x_{ik}$ that is record value of the variable having the index of k in the sample having the index of i. Such a degree of contribution represents the magnitude of influence of the exogenous noise given on the target variable that is the other of the two variables to the source variable that is one of the two variables. Note that the contribution decomposition unit 42 also generates the degree of contribution for a combination of two variables in which the source variable and the target variable are the same variable.

For example, when a first variable among the plurality of variables is set as the target variable and a second variable among the plurality of variables is set as the source variable in the first record data among the one or more pieces of record data, a degree of contribution to the combination of the two variables is a value of a term including the exogenous noise estimation value representing the exogenous noise given to the second variable among a plurality of terms in the linear sum formula. Here, the linear sum formula is a formula for performing a product—sum operation of a row corresponding to the first record data in the exogenous noise matrix E' and a column corresponding to the first variable in the coefficient matrix A. The coefficient matrix A is the inverse matrix $(I'B')^{-1}$ of the matrix (I–B') obtained by subtracting the adjacency matrix B' from the identity matrix I or the generalized inverse matrix $(I-B')^+$.

For example, with respect to the record data of the sample having the index of i (first record data), the degree of contribution when the variable having the index of k (first variable) is set as the target variable and the variable having the index of j (second variable) is set as the source variable is $A_{jk}e_{ij}$. Note that, with respect to the record data of the sample having the index of i (first record data), when both the target variable and the source variable are variables having the index of k (first variable), the degree of contribution is $e_{ik}$.

In the present embodiment, the contribution decomposition unit 42 generates a contribution tensor C that is a third-order tensor. The contribution tensor C includes an i component, a j component, and a k component.

The i component corresponds to each of one or more pieces of record data. In the present embodiment, the i component corresponds to each piece of record data of n samples.

The j component and the k component correspond to each of a plurality of variables. In the present embodiment, the j component and the k component correspond to each of d variables.

In the present embodiment, the contribution decomposition unit 42 calculates $C_{ijk}$ that is an element of the i component, the j component, and the k component in the contribution tensor C by Formula (13).

$$C_{ijk} = e_{ij} A_{jk} \tag{13}$$

That is, each of the plurality of elements in the contribution tensor C represents a degree of contribution in which a variable identified by the j component among the plurality of variables is set as a source variable and a variable identified by the k component among the plurality of variables is set as a target variable, in the record data identified by the i component among the one or more pieces of record data.

Formula (14) is valid for the plurality of elements in the contribution tensor C.

$$x_{ik} = \sum_{j=1}^{d} C_{ijk} \tag{14}$$

That is, each of the plurality of elements in the contribution tensor C represents a term in the linear sum formula for each of the one or more pieces of record data. Therefore, by calculating the contribution tensor C, the contribution decomposition unit 42 can calculate a result obtained by comprehensively analyzing presence of other variables that cause a change in at least one variable among the plurality of variables.

Note that the contribution decomposition unit 42 may include a value obtained by converting the numerical value shown in Formula (13) according to a predetermined rule in the element of the contribution tensor C. For example, the contribution decomposition unit 42 may include a sign indicating positive or negative of the numerical value shown in Formula (13), an absolute value, a value indicating whether the numerical value is included in a range from a predetermined upper limit value to a lower limit value, a value obtained by leveling the numerical value shown in Formula (13) in a predetermined stage, or the like.

The decomposition result storage unit 44 stores the degree of contribution for each combination of two variables in the plurality of variables for each of the one or more pieces of record data calculated by the contribution decomposition unit 42. In the present embodiment, the decomposition result storage unit 44 stores the contribution tensor C.

The output unit 46 outputs the degree of contribution for each set of two variables in the plurality of variables for each of the one or more pieces of record data stored in the decomposition result storage unit 44 by, for example, causing the display device to display the degree of contribution. In the present embodiment, the output unit 46 outputs a value of at least one element in the contribution tensor C stored in the decomposition result storage unit 44 or a value obtained by converting a value of at least one element in the contribution tensor C stored in the decomposition result storage unit 44.

The output unit 46 may receive selection of at least one piece of record data of interest indicating a sample of interest among the one or more pieces of record data. The output unit 46 may receive selection of at least one source variable of interest that is focused as a source variable among the plurality of variables. The output unit 46 may receive selection of at least one target variable of interest that is focused as a target variable among the plurality of variables. Note that the output unit 46 may receive selection of at least one piece of record data of interest, at least one source variable of interest, and at least one target variable of interest according to an operation of the user or may receive the selection based on preset information.

Then, the output unit 46 outputs the degree of contribution corresponding to all or a part of combinations of at least one piece of selected record data of interest, at least one selected source variable of interest, and at least one selected target variable of interest, as cause information. For example, the output unit 46 causes the display device or the like to display the cause information that is a table or a graph representing the degree of contribution corresponding to all or a part of combinations of at least one piece of selected record data of interest, at least one selected source variable of interest, and at least one selected target variable of interest.

Hardware Configuration of Model Update Device 60 and the Like

Figure 17:
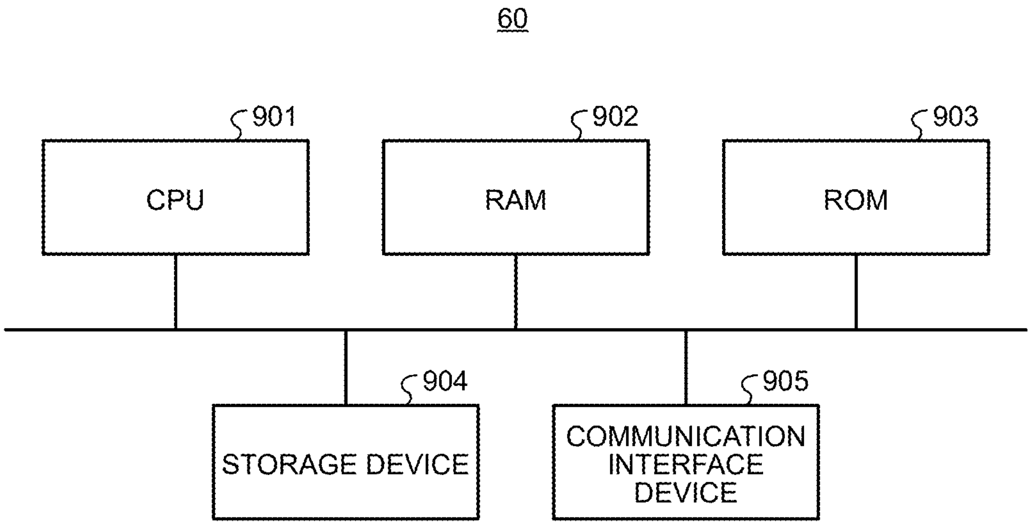
FIG. 17 is a hardware configuration diagram of the model update device.

FIG. 17 is a diagram illustrating an example of a hardware configuration of the model update device 60. The model update device 60 is realized by, for example, an information processing device having a hardware configuration as illustrated in FIG. 17. The model update device 60 includes a central processing unit (CPU) 901, a random access memory (RAM) 902, a read only memory (ROM) 903, a storage device 904, and a communication interface device 905. The units are connected to each other via a bus.

The CPU 901 is one or more processors that execute arithmetic processing, control processing, and the like according to programs. The CPU 901 uses a predetermined area of the RAM 902 as a work area and executes various kinds of processing in cooperation with programs stored in the ROM 903, the storage device 904, and the like.

The RAM 902 is a memory such as a synchronous dynamic random access memory (SDRAM). The RAM 902 functions as a work area of the CPU 901. The ROM 903 is a memory that stores programs and various kinds of information in a non-rewritable manner.

The storage device 904 is a device that writes and reads data to and from a semiconductor storage medium such as a flash memory, a magnetically or optically recordable storage medium, or the like. The storage device 904 writes and reads data to and from the storage medium under control of the CPU 901. The communication interface device 905 communicates with an external device via a network under control of the CPU 901.

The programs executed by the information processing device cause the information processing device to function as the model update device 60. The programs are loaded and executed on the RAM 902 by the CPU 901 (processor).

The programs executed by the information processing device are provided as files in a format installable or executable in the information processing device by being recorded in a recording medium readable by the information processing device such as a CD-ROM, a flexible disk, a CD-R, and a digital versatile disk (DVD).

The programs may be configured to be stored on a computer connected to a network such as the Internet and be provided by being downloaded via the network. The programs may be configured to be provided or distributed via a network such as the Internet. The programs executed by the model update device 60 may be configured to be provided by being incorporated in the ROM 903 or the like in advance.

The programs for causing the information processing device to function as the model update device 60 include, for example, a data acquisition module, an estimation module, a determination module, a learning module, a control module, a result output module, and an update module. The programs are executed by the CPU 901 to load each module into the RAM 902 and cause the CPU 901 to function as the data acquisition unit 62, the estimation unit 66, the determination unit 68, the learning unit 70, the control unit 74, the result output unit 76, and the update unit 78. When the CPU 901 is configured of a plurality of processors, the units may be divided by the plurality of processors. Note that a part or all of the configurations may be configured as hardware. The programs cause the RAM 902 and the storage device 904 to function as the data storage unit 64 and the update model storage unit 72.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising one or more hardware processors configured to:

calculate an exogenous noise matrix, the exogenous noise matrix being obtained by multiplying a record data matrix including one or more pieces of record data including a plurality of record values respectively corresponding to a plurality of variables by a matrix obtained by subtracting a pre-update model from an identity matrix, the pre-update model being represented by an adjacency matrix, the adjacency matrix representing a magnitude of influence from one variable to another variable for each combination of two variables in the plurality of variables, the exogenous noise matrix including a plurality of exogenous noise estimation values corresponding to the plurality of variables for each of the one or more pieces of record data, the plurality of exogenous noise estimation values each representing an estimation value of influence by an exogenous noise that is different from influences from the plurality of variables with respect to a corresponding variable among the plurality of variables;

determine whether a causal relationship of the plurality of variables that is represented by the one or more pieces of record data is different from the causal relationship of the plurality of variables that is represented by the pre-update model, based on the exogenous noise matrix; and generate a post-update model represented by the adjacency matrix based on the one or more pieces of record data when determining that the causal relationships are different.

2. The device according to claim 1, wherein the one or more hardware processors are configured to:

calculate a measure of independence for each combination of two variables in the plurality of variables, the measure of independence representing independence between two or more columns or rows corresponding to the two variables in the exogenous noise matrix;

compare the calculated measure of independence with a threshold for each combination of the two variables in the plurality of variables; and determine whether the causal relationship of the plurality of variables that is represented by the one or more pieces of record data is different from the causal relationship of the plurality of variables that is represented by the pre-update model, based on a comparison result between the measure of independence and the threshold for each combination of the two variables in the plurality of variables.

3. The device according to claim 2, wherein the one or more hardware processors are configured to calculate, as the measure of independence, any value of a correlation coefficient, a rank correlation coefficient, a mutual information, a pairwise likelihood ratio, a distance correlation, a Hilbert-Schmidt independence criterion (HSIC), a maximal information coefficient (MIC), and a randomized dependence coefficient (RDC) between two columns corresponding to the two variables in the exogenous noise matrix, or a value obtained by combining two or more of them.

4. The device according to claim 1, wherein the one or more hardware processors are configured to:

calculate measure of independences for respective combinations of two variables in the plurality of variables, the measure of independence representing independence between two or more columns or rows corresponding to the two variables in the exogenous noise matrix;

calculate a statistical value obtained by integrating the calculated measure of independences for the combinations of the two variables in the plurality of variables; and determine whether the causal relationship of the plurality of variables that is represented by the one or more pieces of record data is different from the causal relationship of the plurality of variables that is represented by the pre-update model, based on a comparison result between the statistical value and a threshold.

5. The device according to claim 1, wherein the one or more hardware processors are configured to:

estimate a new value corresponding to a nonzero element in the adjacency matrix representing the pre-update model using linear regression based on the one or more pieces of record data when determining that the causal relationships are different, and generate the post-update model by updating a value of the nonzero element in the adjacency matrix representing the pre-update model to the estimated new value.

6. The device according to claim 1, wherein the one or more hardware processors are configured to generate the post-update model using regularized linear regression based on the one or more pieces of record data while causing a causal order to be the same as the adjacency matrix representing the pre-update model, when determining that the causal relationships are different.

7. The device according to claim 6, wherein
the one or more hardware processors are configured to generate the post-update model using Lasso or Adaptive Lasso based on the one or more pieces of record data so as to cause the causal order of the post-update model to be the same as the causal order of the adjacency matrix representing the pre-update model, when determining that the causal relationships are different.

8. The device according to claim 6, wherein
the one or more hardware processors are configured to generate the post-update model using any one of Adaptive Lasso, Transfer Lasso, or Adaptive Transfer Lasso with the pre-update model as an initial estimation amount, based on the one or more pieces of record data so as to cause the causal order to be the same as the adjacency matrix representing the pre-update model, when determining that the causal relationships are different.

9. The device according to claim 1, wherein
the one or more hardware processors are configured to generate the post-update model including a causal order, based on the one or more pieces of record data when determining that the causal relationships are different.

10. The device according to claim 9, wherein
the one or more hardware processors are configured to generate the post-update model based on a causal discovery method based on non-Gaussianity.

11. The device according to claim 10, wherein
the one or more hardware processors are configured to generate the post-update model based on ICA-LINGAM or DirectLiNGAM.

12. The device according to claim 1, wherein
the one or more hardware processors are configured to:
generate a plurality of first exogenous noise estimation values that are the plurality of exogenous noise estimation values for each of the one or more pieces of record data, based on the one or more pieces of record data and the pre-update model;
execute first determination processing of determining whether the causal relationship of the plurality of variables that is represented by the one or more pieces of record data is different from the causal relationship of the plurality of variables that is represented by the pre-update model, based on independence between any two or more variables in the plurality of first exogenous noise estimation values for each of the one or more pieces of record data;
output at least one piece of information from information indicating there is no change in causal influence, there is no change in causal structure, and there is no change in causal order when determining that the causal relationships are not different by the first determination processing,
generate a first structural causal model representing each causal relationship of the plurality of variables by estimating a new value corresponding to a nonzero element in the adjacency matrix representing the pre-update model using linear regression based on the one or more pieces of record data and updating a value of the nonzero element in the adjacency matrix representing the pre-update model to the estimated new value when determining that the causal relationships are different by the first determination processing,
generate a plurality of second exogenous noise estimation values that are the plurality of exogenous noise estimation values for each of the one or more pieces of record data, based on the one or more pieces of record data and the first structural causal model,
execute second determination processing of determining whether the causal relationship of the plurality of variables that is represented by the one or more pieces of record data is different from a causal relationship of the plurality of variables that is represented by the first structural causal model, based on independence between any two or more variables in the plurality of second exogenous noise estimation values for each of the one or more pieces of record data; and
output at least one piece of information from information indicating there is a change in causal influence, there is no change in causal structure, and there is no change in causal order, when determining that the causal relationships are not different by the second determination processing.

13. The device according to claim 12, wherein
the one or more hardware processors are configured to:
generate a second structural causal model representing the causal relationships of the plurality of variables using regularized linear regression, based on the one or more pieces of record data while causing a causal order to be the same as the adjacency matrix representing the pre-update model, when determining that the causal relationships are different by the second determination processing;
generate a plurality of third exogenous noise estimation values that are the plurality of exogenous noise estimation values for each of the one or more pieces of record data, based on the one or more pieces of record data and the second structural causal model;
execute third determination processing of determining whether the causal relationship of the plurality of variables that is represented by the one or more pieces of record data is different from a causal relationship of the plurality of variables that is represented by the second structural causal model, based on independence between any two or more variables in the plurality of third exogenous noise estimation values for each of the one or more pieces of record data;
output at least one piece of information from information indicating there is a change in causal influence, there is a change in causal structure, and there is no change in causal order, when determining that the causal relationships are not different by the third determination processing; and
output at least one piece of information from information indicating there is a change in causal influence, there is a change in causal structure, and there is a change in causal order, when determining that the causal relationships are different by the third determination processing.

14. The device according to claim 1, wherein
the one or more hardware processors are configured to:
generate a plurality of first exogenous noise estimation values that are the plurality of exogenous noise estimation values for each of the one or more pieces of record data, based on the one or more pieces of record data and the pre-update model;

execute first determination processing of determining whether the causal relationship of the plurality of variables that is represented by the one or more pieces of record data is different from the causal relationship of the plurality of variables that is represented by the pre-update model, based on independence between any two or more variables in the plurality of first exogenous noise estimation values for each of the one or more pieces of record data;

output at least one piece of information from information indicating there is no causal influence, there is no change in causal structure, and there is no change in causal order, when determining that the causal relationships are not different by the first determination processing;

generate a second structural causal model representing the causal relationships of the plurality of variables using regularized linear regression, based on the one or more pieces of record data while causing a causal order to be the same as the adjacency matrix representing the pre-update model, when determining that the causal relationships are different by the first determination processing;

generate a plurality of third exogenous noise estimation values that are the plurality of exogenous noise estimation values for each of the one or more pieces of record data, based on the one or more pieces of record data and the second structural causal model;

execute third determination processing of determining whether the causal relationship of the plurality of variables that is represented by the one or more pieces of record data is different from a causal relationship of the plurality of variables that is represented by the second structural causal model, based on independence between any two or more variables in the plurality of third exogenous noise estimation values for each of the one or more pieces of record data;

output at least one piece of information from information indicating there is a change in causal influence, there is a change in causal structure, and there is no change in causal order, when determining that the causal relationships are not different by the third determination processing; and output at least one piece of information from information indicating there is a change in causal influence, there is a change in causal structure, and there is a change in causal order, when determining that the causal relationships are different by the third determination processing.

15. The device according to claim 1, wherein the one or more hardware processors are configured to:

generate the plurality of exogenous noise estimation values for each of the one or more pieces of record data, based on the one or more pieces of record data and the post-update model; and output at least one piece of information from information indicating whether there is a change in causal influence, whether there is a change in causal structure, and whether there is a change in causal order, based on independence between any two or more variables in the plurality of exogenous noise estimation values after update for each of the one or more pieces of record data.

16. The device according to claim 1, wherein the one or more hardware processors are configured to output the adjacency matrix representing the post-update model or a difference matrix between the adjacency matrix representing the pre-update model and the adjacency matrix representing the post-update model.

17. The device according to claim 1, wherein the one or more hardware processors are configured to display the adjacency matrix representing the post-update model.

18. An information processing system comprising:

the information processing device according to claim 1; and an analysis device, wherein the analysis device is configured to:

calculate the plurality of exogenous noise estimation values based on the one or more pieces of record data and the pre-update model; and generate a degree of contribution representing a magnitude of influence that the exogenous noise given to a source variable that is a first one of two variables exerts on a target variable that is a second one of the two variables for each combination of the two variables in the plurality of variables in each of the one or more pieces of record data, based on the pre-update model and the plurality of exogenous noise estimation values for each of the one or more pieces of record data.

19. An information processing system comprising:

the information processing device according to claim 1; and a change detection device configured to detect a change in a state of a target system configured to output the one or more pieces of record data, wherein the change detection device is configured to cause the information processing device to execute processing when detecting a change in the state of the target system.

20. The system according to claim 19, wherein the target system is a system that manufactures a product, the plurality of variables include a quality characteristic of the product as a variable, and the change detection device is configured to cause the information processing device to execute processing when a record value of the variable representing the quality characteristic of the product deviates from control limits or specification limits defined by a control chart generated in advance.

21. An information processing method executed by one or more hardware processors of an information processing device, the method comprising:

by the information processing device, calculating an exogenous noise matrix, the exogenous noise matrix being obtained by multiplying a record data matrix including one or more pieces of record data including a plurality of record values respectively corresponding to a plurality of variables by a matrix obtained by subtracting a pre-update model from an identity matrix, the pre-update model being represented by an adjacency matrix, the adjacency matrix representing a magnitude of influence from one variable to another variable for each combination of two variables in the plurality of variables, the exogenous noise matrix including a plurality of exogenous noise estimation values corresponding to the plurality of variables for each of the one or more pieces of record data, the plurality of exogenous noise estimation values each representing an estimation value of influence by an exogenous noise that is different from influences from the plurality of variables with respect to a corresponding variable among the plurality of variables;

by the information processing device, determining whether a causal relationship of the plurality of variables that is represented by the one or more pieces of record data is different from the causal relationship of the plurality of variables that is represented by the pre-update model, based on the exogenous noise matrix; and by the information processing device, generating a post-update model represented by the adjacency matrix based on the one or more pieces of record data when determining that causal relationships are different.

22. A computer program product comprising a non-transitory computer-readable medium including instructions stored thereon, the instructions causing a computer to execute:

calculating an exogenous noise matrix, the exogenous noise matrix being obtained by multiplying a record data matrix including one or more pieces of record data including a plurality of record values respectively corresponding to a plurality of variables by a matrix obtained by subtracting a pre-update model from an identity matrix, the pre-update model being represented by an adjacency matrix, the adjacency matrix representing a magnitude of influence from one variable to another variable for each combination of two variables in the plurality of variables, the exogenous noise matrix including a plurality of exogenous noise estimation values corresponding to the plurality of variables for each of the one or more pieces of record data, the plurality of exogenous noise estimation values each representing an estimation value of influence by an exogenous noise that is different from influences from the plurality of variables with respect to a corresponding variable among the plurality of variables;

determining whether a causal relationship of the plurality of variables that is represented by the one or more pieces of record data is different from the causal relationship of the plurality of variables that is represented by the pre-update model, based on the exogenous noise matrix; and generating a post-update model represented by the adjacency matrix based on the one or more pieces of record data when determining that causal relationships are different.

* * * * *